(12) United States Patent
Brook et al.

(10) Patent No.: US 7,480,864 B2
(45) Date of Patent: Jan. 20, 2009

(54) ZOOM EDITOR

(75) Inventors: John Charles Brook, Stanhope Gardens NSW (AU); Julie Rae Kowald, Newport NSW (AU); Rupert William Galloway Reeve, Redfern NSW (AU); Choi Chi Evelene Ma, Ashfield NSW (AU); Joshua Worrill, Ryde NSW (AU)

(73) Assignee: Canon Kabushiki Kaisha, Tokyo (JP)

( * ) Notice: Subject to any disclaimer, the term of this patent is extended or adjusted under 35 U.S.C. 154(b) by 1038 days.

(21) Appl. No.: 10/268,753

(22) Filed: Oct. 11, 2002

(65) Prior Publication Data
US 2003/0090504 A1 May 15, 2003

(30) Foreign Application Priority Data
Oct. 12, 2001 (AU) ..................................... PR8248
Oct. 12, 2001 (AU) ..................................... PR8249

(51) Int. Cl.
*G06F 3/048* (2006.01)
(52) U.S. Cl. ...................... 715/720; 715/721; 715/723; 715/725; 715/845; 386/52
(58) Field of Classification Search .................. 715/720, 715/721, 719, 722, 723, 724, 725, 726, 838, 715/845; 386/4, 6, 55, 52
See application file for complete search history.

(56) References Cited

U.S. PATENT DOCUMENTS

| | | | | |
|---|---|---|---|---|
| 5,821,945 | A | | 10/1998 | Yeo et al. ..................... 345/440 |
| 5,995,095 | A | * | 11/1999 | Ratakonda ................ 715/500.1 |
| 6,204,840 | B1 | * | 3/2001 | Petelycky et al. ......... 715/500.1 |
| 6,307,550 | B1 | * | 10/2001 | Chen et al. .................... 345/418 |
| 6,868,440 | B1 | * | 3/2005 | Gupta et al. ................. 709/219 |
| 6,907,570 | B2 | * | 6/2005 | Amir et al. ................... 715/720 |

FOREIGN PATENT DOCUMENTS

| | | |
|---|---|---|
| CA | 2202688 | 10/1998 |
| EP | 1 024 444 A2 | 8/2000 |
| WO | WO 01/52077 A1 | 7/2001 |
| WO | WO 03/012680 | 2/2003 |

* cited by examiner

*Primary Examiner*—Dennis-Doon Chow
*Assistant Examiner*—Blaine T. Basom
(74) *Attorney, Agent, or Firm*—Fitzpatrick, Cella, Harper & Scinto

(57) ABSTRACT

A method and apparatus for processing media items is disclosed. The method involves selecting a sub-set (106) of the media items (102), and concurrently displaying a spatial representation (606) and a temporal representation (610) of the selected sub-set. Using this starting point, a user can browse, using either a temporal control input (414) or a spatial control input (406), applied to the associated temporal or spatial display (610, 606 respectively), to modify the media item selection (106). The display corresponding to the non-selected navigation mode is automatically and contemporaneously changed to reflect the change in the media item selection.

20 Claims, 20 Drawing Sheets

ZOOM EDITOR

FIELD OF THE INVENTION

The present invention relates generally to editors for media items and, in particular, to methods and devices adapted for use by inexperienced users. The present invention relates to a method and apparatus for browsing, editing and previewing a set of media items. The invention also relates to a computer program and a computer program product, including a computer readable medium, having recorded thereon a computer program for browsing, editing and previewing a set of media items.

BACKGROUND

The conventional approach to editing media material involves periodically halting work on the editing procedure, and conducting a preview of edited material which has been compiled thus far. After the preview, the user continues to compose the edit, cycling through the aforementioned procedure as many times as is desired. It is thus difficult and inconvenient for the user to gain a real appreciation of the result of an edit operation during compilation of the editing itself.

Exacerbating this situation is the fact that as archives of data content increase in size, it becomes progressively more difficult to browse and search such collections. This is particularly pertinent when considering multi-media content, and more so in the context of finding and extracting suitable material for editing and compilation into ordered presentations. Conventional browsers typically present a user with either too broad, or alternately too narrow a view of the stored material for convenient browsing and navigation of the material.

SUMMARY

It is an object of the present invention to substantially overcome, or at least ameliorate, one or more disadvantages of existing arrangements.

According to a first aspect of the invention, there is provided a method of processing a set of media items, the method comprising the steps of:

(a) selecting a sub-set of said media items;

(b) concurrently displaying (i) a spatial representation of the selected sub-set and (ii) a temporal representation of the selected sub-set;

(c) selecting one of a temporal navigation mode and a spatial navigation mode;

(d) providing a spatial navigation command, if the spatial navigation mode has been selected, to the spatial representation to thereby modify the selection of the sub-set of said media items, to thereby contemporaneously change the spatial representation and the corresponding temporal representation; and (e) providing a temporal navigation command, if the temporal navigation mode has been selected, to the temporal representation to thereby modify the selection of the sub-set of said media items, to thereby contemporaneously change the temporal representation and the corresponding spatial representation, wherein the selected sub-set includes at least one of wholly encompassed media items and partially encompassed media items from the set;

the displayed spatial representation of the selected sub-set can include, dependent on spatial selection rules, at least one of representations of said wholly encompassed media items, and spatial representations of said partially encompassed media items; and the displayed temporal representation of the selected sub-set can include, dependent on temporal selection rules, at least one of a temporal representation of said wholly encompassed media items, and a temporal representation of said partially encompassed media items.

The method further comprises, in relation to said partially encompassed media items, the steps of:

determining whether a pixel area of the partially encompassed media items captured by the selecting step exceeds a pixel threshold; and if the pixel area exceeds the pixel threshold;

displaying, depending upon the pixel area captured by the selecting step, a part of the partially encompassed media items in the spatial representation of the selected sub-set; and displaying, depending upon the pixel area captured by the selecting step, time segments of the partially encompassed media items in the temporal representation of the selected sub-set.

According to another aspect of the invention, there is provided an apparatus for processing a set of media items, the apparatus comprising:

(a) selecting means for selecting a sub-set of said media items;

(b) displaying means for concurrently displaying (i) a spatial representation of the selected sub-set and (ii) a temporal representation of the selected sub-set;

(c) selecting means for selecting one of a temporal navigation mode and a spatial navigation mode;

(d) providing means for providing a spatial navigation command, if the spatial navigation mode has been selected, to the spatial representation to thereby modify the selection of the sub-set of said media items, to thereby contemporaneously change the spatial representation and the corresponding temporal representation; and (e) providing means for providing a temporal navigation command, if the temporal navigation mode has been selected, to the temporal representation to thereby modify the selection of the sub-set of said media items, to thereby contemporaneously change the temporal representation and the corresponding spatial representation, wherein the selected sub-set includes at least one of wholly encompassed media items and partially encompassed media items from the set;

the displayed spatial representation of the selected sub-set can include, dependent on spatial selection rules, at least one of representations of said wholly encompassed media items, and spatial representations of said partially encompassed media items; and the displayed temporal representation of the selected sub-set can include, dependent on temporal selection rules, at least one of a temporal representation of said wholly encompassed media items, and a temporal representation of said partially encompassed media items.

The apparatus further comprises, in relation to said partially encompassed media items:

determining means for determining whether a pixel area of the partially encompassed media items captured by the selecting step exceeds a pixel threshold; and displaying means for, if the pixel area exceeds the pixel threshold;

displaying, depending upon the pixel area captured by the selecting step, a part of the partially encompassed media items in the spatial representation of the selected sub-set; and displaying, depending upon the pixel area captured by the selecting step, time segments of the partially encompassed media items in the temporal representation of the selected sub-set.

According to another aspect of the invention, there is provided a computer program product including a computer readable storage medium having recorded thereon a computer program for directing a processor to execute a method for processing a set of media items, the program comprising:

(a) code for a selecting step for selecting a sub-set of said media items;

(b) code for a displaying step for concurrently displaying (i) a spatial representation of the selected sub-set and (ii) a temporal representation of the selected sub-set;

(c) code for a selecting step for selecting one of a temporal navigation mode and a spatial navigation mode;

(d) code for a providing step for providing a spatial navigation command, if the spatial navigation mode has been selected, to the spatial representation to thereby modify the selection of the sub-set of said media items, to thereby contemporaneously change the spatial representation and the corresponding temporal representation; and (e) code for a providing step for providing a temporal navigation command, if the temporal navigation mode has been selected, to the temporal representation to thereby modify the selection of the sub-set of said media items, to thereby contemporaneously change the temporal representation and the corresponding spatial representation, wherein the selected sub-set includes at least one of wholly encompassed media items and partially encompassed media items from the set;

the displayed spatial representation of the selected sub-set can include, dependent on spatial selection rules, at least one of representations of said wholly encompassed media items, and spatial representations of said partially encompassed media items; and the displayed temporal representation of the selected sub-set can include, dependent on temporal selection rules, at least one of a temporal representation of said wholly encompassed media items, and a temporal representation of said partially encompassed media items.

The program further comprises, in relation to said partially encompassed media items:

code for determining whether a pixel area of the partially encompassed media items captured by the selecting step exceeds a pixel threshold; and code for, if the pixel area exceeds the pixel threshold;

displaying, depending upon the pixel area captured by the selecting step, a part of the partially encompassed media items in the spatial representation of the selected sub-set; and displaying, depending upon the pixel area captured by the selecting step, time segments of the partially encompassed media items in the temporal representation of the selected sub-set.

According to another aspect of the invention, there is provided an apparatus for processing a set of media items, the apparatus comprising:

a memory configured to store a program; and a processor for executing the program, said program comprising:

(a) code for a selecting step for selecting a sub-set of said media items;

(b) code for a displaying step for concurrently displaying (i) a spatial representation of the selected sub-set and (ii) a temporal representation of the selected sub-set;

(c) code for a selecting step for selecting one of a temporal navigation mode and a spatial navigation mode;

(d) code for a providing step for providing a spatial navigation command, if the spatial navigation mode has been selected, to the spatial representation to thereby modify the selection of the sub-set of said media items, to thereby contemporaneously change the spatial representation and the corresponding temporal representation; and (e) code for a providing step for providing a temporal navigation command, if the temporal navigation mode has been selected, to the temporal representation to thereby modify the selection of the sub-set of said media items, to thereby contemporaneously change the temporal representation and the corresponding spatial representation, wherein the selected sub-set includes at least one of wholly encompassed media items and partially encompassed media items from the set;

the displayed spatial representation of the selected sub-set can include, dependent on spatial selection rules, at least one of representations of said wholly encompassed media items, and spatial representations of said partially encompassed media items; and the displayed temporal representation of the selected sub-set can include, dependent on temporal selection rules, at least one of a temporal representation of said wholly encompassed media items, and a temporal representation of said partially encompassed media items.

The program further comprises, in relation to said partially encompassed media items:

code for determining whether a pixel area of the partially encompassed media items captured by the selecting step exceeds a pixel threshold; and code for, if the pixel area exceeds the pixel threshold;

displaying, depending upon the pixel area captured by the selecting step, a part of the partially encompassed media items in the spatial representation of the selected sub-set; and displaying, depending upon the pixel area captured by the selecting step, time segments of the partially encompassed media items in the temporal representation of the selected sub-set.

According to another aspect of the invention, there is provided an apparatus for browsing a set of media items, comprising:

selecting means for selecting a sub-set of said media items;

displaying means for displaying, substantially simultaneously, representations of said sub-set and a temporal summary related to said sub-set;

providing means for providing a first navigation input to the display of the representations of the sub-set, to thereby effect a corresponding change in the selection of the sub-set and consequently a change in both said displayed representations of said sub-set and said displayed temporal summary related to said sub-set; and providing means for providing a second navigation input to the display of the temporal summary related to the sub-set, to thereby effect a corresponding change in the selection of the sub-set and consequently a change in both said displayed temporal summary related to said sub-set and said displayed representations of said sub-set, wherein the selected sub-set includes at least one of wholly encompassed media items and partially encompassed media items from the set;

the displayed representations of the selected sub-set can include, dependent on spatial selection rules, at least one of representations of said wholly encompassed media items, and representations of said partially encompassed media items; and the displayed temporal summary relating to the selected sub-set can include, dependent on temporal selection rules, at least one of a temporal summary related to said wholly encompassed media items, and a temporal summary related to said partially encompassed media items.

The apparatus further comprises:

determining means for determining whether a pixel area of the partially encompassed media items captured by the selecting step exceeds a pixel threshold; and displaying means for, if the pixel area exceeds the pixel threshold;

displaying, depending upon the pixel area captured by the selecting step, a part of the partially encompassed media items in the representations of the selected sub-set; and for displaying, depending upon the pixel area captured by the selecting step, time segments of the partially encompassed media items in the temporal summary of the selected sub-set.

According to another aspect of the invention, there is a provided an apparatus for browsing a set of media items, comprising:

providing means for providing a first navigation input relative to a display in a first display window to thereby (i) select a first sub-set of said media items, (ii) display, in said first display window, representations of said first sub-set, and (iii) display, in a second display window, a temporal summary relating to said first sub-set;

providing means for providing a second navigation input relative to the display in the second display window to thereby (i) select a second sub-set of said media items, (ii) contemporaneously display, in the first display window, representations of the second sub-set, and (iii) display, in the second display window, a temporal summary relating to the second sub-set; and a display wherein the first display window and the second display window are made substantially simultaneously visible to a user, wherein the first or second selected sub-set includes at least one of wholly encompassed media items and partially encompassed media items from the set;

the displayed representations of the first or second selected sub-set can include, dependent on spatial selection rules, at least one of representations of said wholly encompassed media items, and representations of said partially encompassed media items; and the displayed temporal summary relating to the first or second selected sub-set can include, dependent on temporal selection rules, at least one of a temporal summary related to said wholly encompassed media items, and a temporal summary related to said partially encompassed media items.

The apparatus further comprises:

determining means for determining whether a pixel area of the partially encompassed media items captured by the selecting step exceeds a pixel threshold; and displaying means for, if the pixel area exceeds the pixel threshold;

displaying, depending upon the pixel area captured by the selecting step, a part of the partially encompassed media items in the representations of the selected sub-set; and for displaying, depending upon the pixel area captured by the selecting step, time segments of the partially encompassed media items in the temporal summary of the selected sub-set.

According to another aspect of the invention, there is provided a method of browsing a set of media items, the method comprising the steps of:

selecting a sub-set of said media items; displaying, substantially simultaneously, representations of said sub-set and a temporal summary related to said sub-set;

providing a first navigation input to the display of the representations of the sub-set, to thereby effect a corresponding change in the selection of the sub-set and consequently a change in both said displayed representations of said sub-set and said displayed temporal summary related to said sub-set; and providing a second navigation input to the display of the temporal summary related to the sub-set, to thereby effect a corresponding change in the selection of the sub-set and consequently a change in both said displayed temporal summary related to said sub-set and said displayed representations of said sub-set, wherein the selected sub-set includes at least one of wholly encompassed media items and partially encompassed media items from the set;

the displayed representations of the selected sub-set can include, dependent on spatial selection rules, at least one of representations of said wholly encompassed media items, and spatial representations of said partially encompassed media items; and the displayed temporal summary of the selected sub-set can include, dependent on temporal selection rules, at least one of a temporal summary of said wholly encompassed media items, and a temporal summary of said partially encompassed media items.

The method further comprises, in relation to said partially encompassed media item, the steps of:

determining whether a pixel area of the partially encompassed media items captured by the selecting step exceeds a pixel threshold; and if the pixel area exceeds the pixel threshold;

displaying, depending upon the pixel area captured by the selecting step, a part of the partially encompassed media items in the representations of the selected sub-set; and displaying, depending upon the pixel area captured by the selecting step, time segments of the partially encompassed media items in the temporal summary of the selected sub-set.

According to another aspect of the invention, there is provided a method of browsing a set of media items, the method comprising the steps of:

providing a first navigation input relative to a display in a first display window to thereby (i) select a first sub-set of said media items, (ii) contemporaneously display, in said first display window, representations of said first sub-set, and (iii) display, in a second display window, a temporal summary relating to said first sub-set;

providing a second navigation input relative to the display in the second display window to thereby (i) select a second sub-set of said media items, (ii) contemporaneously display, in the first display window, representations of the second sub-set, and (iii) display, in the second display window, a temporal summary relating to the second sub-set; and displaying, substantially simultaneously, the first display window and the second display window, wherein the first or second selected sub-set includes at least one of wholly encompassed media items and partially encompassed media items from the set;

the displayed representations of the first or second selected sub-set can include, dependent on spatial selection rules, at least one of representations of said wholly encompassed media items, and spatial representations of said partially encompassed media items; and the displayed temporal summary of the first or second selected sub-set can include, dependent on temporal selection rules, at least one of a temporal summary of said wholly encompassed media items, and a temporal summary of said partially encompassed media items.

The method further comprises, in relation to said partially encompassed media items, the steps of:

determining whether a pixel area of the partially encompassed media items captured by the selecting step exceeds a pixel threshold; and if the pixel area exceeds the pixel threshold;

displaying, depending upon the pixel area captured by the selecting step, a part of the partially encompassed media items in the representations of the selected sub-set; and displaying, depending upon the pixel area captured by the selecting step, time segments of the partially encompassed media items in the temporal summary of the selected sub-set.

Other aspects of the invention are also disclosed.

BRIEF DESCRIPTION OF THE DRAWINGS

A number of embodiments of the present invention will now be described with reference to the drawings, in which.

DETAILED DESCRIPTION INCLUDING BEST MODE

Figure 1:
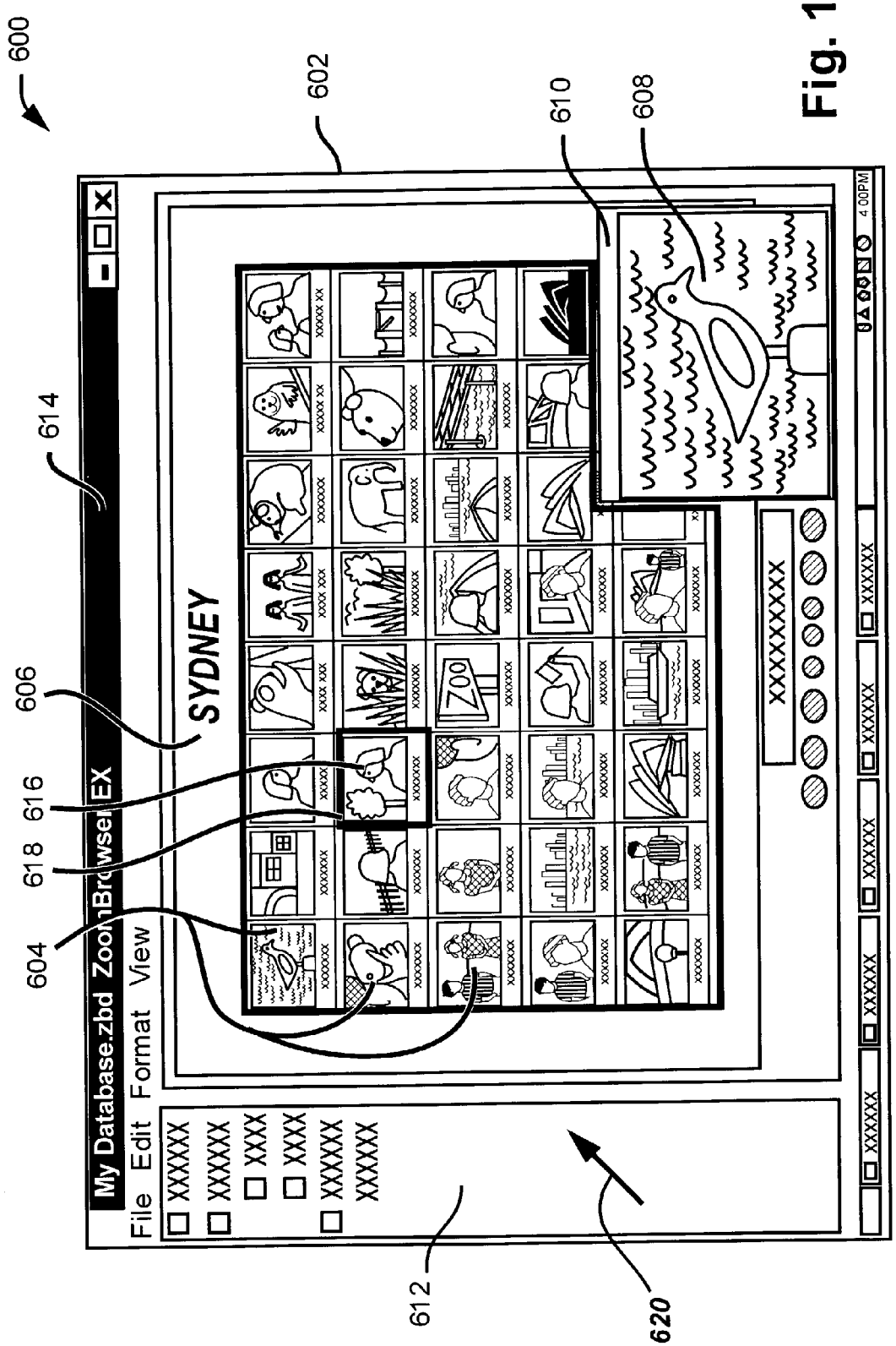
FIG. 1 shows a Graphical User Interface (GUI) of a browsing and editing system.

Where reference is made in any one or more of the accompanying drawings to steps and/or features which have the same reference numerals, those steps and/or features have, for the purposes of this description, the same function(s) or operation(s), unless the contrary intention appears. The following description relates to media content items in general, including video clips, still images, audio selections and other media items. For the sake of convenience and simplicity, however, the description is directed primarily to video clips and still images.

Turning to terminology issues, the term "highlight" is used in this description in one of two ways. In regard to FIG. 1 the term highlight is used to denote the situation in which a particular thumbnail 616 is selected (highlighted) by the user, thereby causing a selection frame 618 to be displayed around the selected thumbnail 616. In Example "E", the term highlight is used to denote a single frame marker indicating regions of a production that are of interest to a user. The particular meaning intended is clear from the context.

Human perception encompasses numerous sensory modalities, two primary examples being the "spatial" modality, and the "temporal" modality. Accordingly, human perception is particularly adept at grasping spatial arrangements of objects. The traditional "multi-folder" depiction of computer directories is eloquent testimony of the popularity of this style of arrangement. Furthermore, human beings are also skilled in grasping and analysing temporal displays such as video clips and audio selections.

FIG. 1 shows a Graphical User Interface (GUI) 600 for browsing media items. In the GUI 600, both spatial and temporal sensory modalities are exploited. FIG. 1 shows a computer display window 602 having a menu area 612 in which a mouse cursor 620 is presently located, and a display area 614. Within the display area 614, a "zoom browsing window" 606 is delimited by a series of line segments describing a frame within which thumbnail images, exemplified by 604, are displayed. The thumbnail images 604 can represent various types of media items, including still images, video clips, audio selections and so on. A "video zoom window" 610 overlies the zoom browsing window 606 to some degree, and a static image 608, which is intended to depict a moving video display in practice, is shown in the video zoom window 610.

Underlying the browser GUI 600, is a set of media items, being video clips in the present example, from which a selection has been made. This selection is shown in spatial summary form by the thumbnails 604 in the zoom browsing window 606. Simultaneously therewith, the selection of media items (video clips) is shown in a temporal summary form in the video zoom window 610. A user of the browser GUI 600 is thus presented simultaneously with a spatial summary display of the selected video clips in the zoom browsing window 606, and a temporal summary display of the selected video clips in the video zoom window 610. The simultaneous presentation of the spatial summary display and the temporal summary display provides the user of the browser GUI 600 with a powerful tool for navigating the set of media items referenced by the GUI 600.

FIG. 1 shows that a particular thumbnail 616 has been selected (highlighted) by the user, thereby causing a selection frame 618 to be displayed around the selected thumbnail 616. One or more thumbnails can be selected in this manner. Accordingly, two forms of selection can be made from the set of media items being navigated using the browser GUI 600, one form of selection using the zoom browsing window 606, and the second form using highlighting of individual media items, as exemplified by 616. The operation of the browser GUI 600 is explained in more detail with reference to FIG. 2, which depicts the aforementioned GUI 600 in an abstract form 100.

Figure 2:
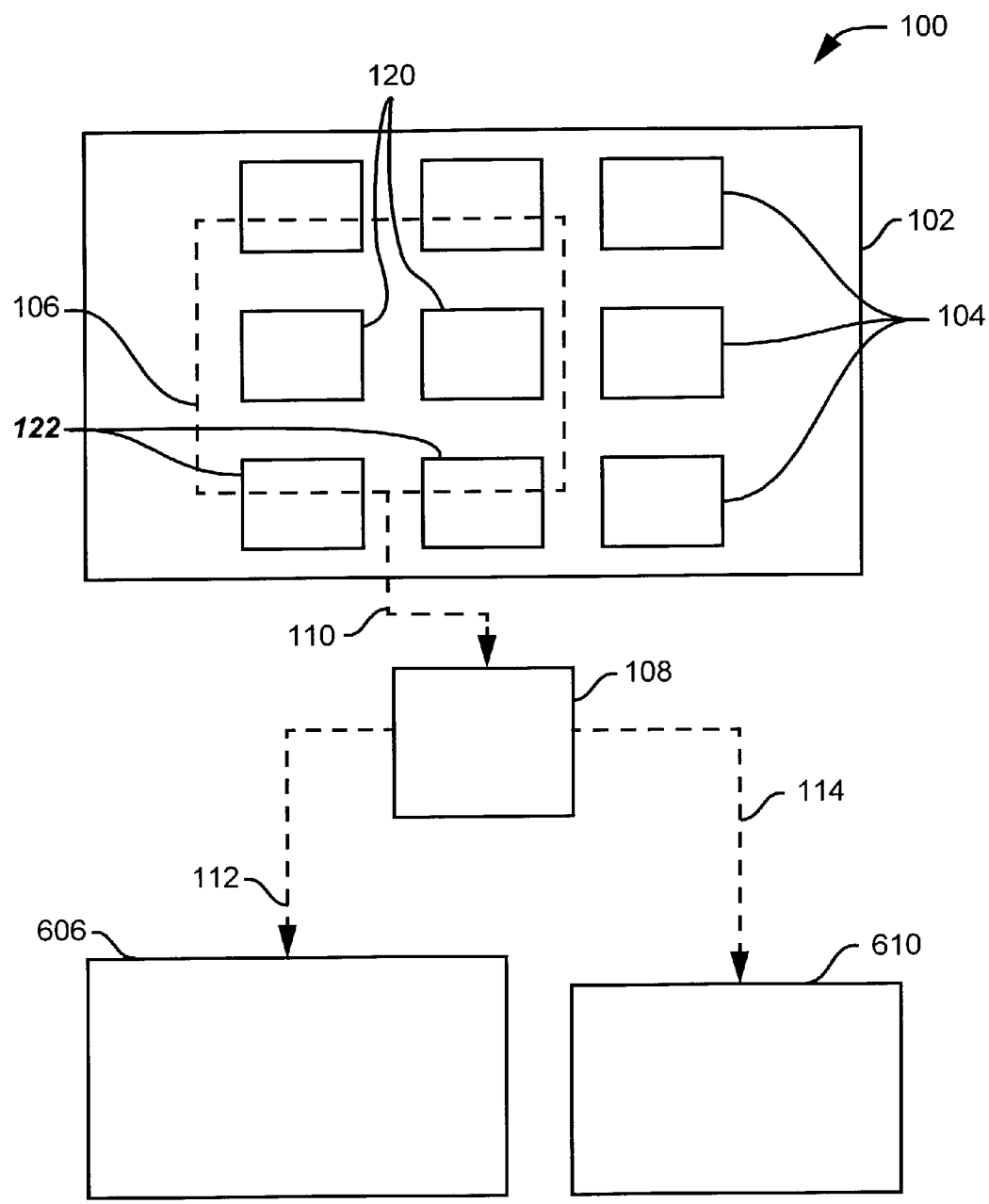
FIG. 2 depicts a functional block diagram representation of a GUI system.

FIG. 2 shows a set of media items 102, containing individual media items 104, which is to be navigated using the GUI 600. A selected sub-set of media items 106 is encompassed by a dashed rectangle. The selected sub-set 106 contains "wholly encompassed" media items 120, and "partially encompassed" media items 122. A wholly encompassed video clip 120 is captured in its entirety within the selection 106, whereas as a partially encompassed video clip 122 is captured within the selection 106 only to a partial extent, some sections of the video clip being excluded therefrom. The partial inclusion of a video clip can mean that certain time segments thereof are included within the selection 106, whereas other time segments are excluded therefrom.

The selected sub-set 106 of video clips is operated upon, as depicted by a dashed arrow segment 110, by a set of display rules 108. This processing produces, as depicted by a dashed arrow 112, a spatial summary display 606 of the selected sub-set 106 of video clips. The spatial summary display 606 takes the form of the thumbnails 604 in the zoom browsing window 606 of FIG. 1. A qualified 1:1 mapping exists between the selected sub-set 106 of media items and the spatial display thereof in the zoom browsing window 606. The 1:1 mapping is qualified by the action of spatial extraction rules and video rules that will be described in relation to FIG. 5. Although the zoom browsing window 606 in FIG. 1 shows forty thumbnails which are wholly encompassed within the zoom browsing window frame, and the dashed rectangle depicting the selected sub-set 106 in FIG. 2 shows a smaller number of both wholly and partially encompassed media items 120 and 122 respectively, it is noted that the difference between the selection shown in the dashed rectangle 106, and the selection shown in the zoom browsing window 606, derives merely from different illustrated instances of selection in FIGS. 1 and 2.

The selection 106 thus provides a "window" view of the media items which are made visible to the user by moving the selection window 106 about the media items in the set 102. Navigation of the selection window 106 around the set 102 is thus one form of "selection" which can be applied to the media items in the set 102. Furthermore, and as previously described, individual media items can be highlighted, thus providing the additional mode of selection. Although individual media items 616 are typically highlighted within the zoom browsing window 606, this window 606 can subsequently be navigated "away" from the selected media item 616. If the media item 616 remains selected, then the selection is not automatically nullified by navigating the zoom browsing window 606 away from the item 616. It is thus possible to navigate the zoom browsing window 606 around the set of media items 102, progressively selecting individual media items 616, or groups of media items, as the zoom browsing window 606 is moved. The individual media items which are highlighted in the aforementioned manner can be individually de-selected (and the highlighting thereby removed), or the de-selection can be performed globally.

The set of display rules 108 also produces, as depicted by an arrow 114, a temporal summary display 610 that takes the form of the video display 608 in the video zoom window 610 of FIG. 1. The spatial summary display 606 in FIG. 2 is a generalisation of the zoom browsing window 606 shown in FIG. 1, and accordingly the same reference numeral is used in relation to both items. The temporal summary display 610 in FIG. 2 is a generalisation of the video zoom window 610 in FIG. 1, and accordingly the same reference numeral is used in relation to both items.

The advantage of the browser GUI 600 arises from the ease with which the user can navigate through the set of media items 102, by using both the spatial summary display 606 and the temporal summary display 610 as visual feedback cues to assist in the navigation function. The user is provided with two mechanisms for interaction with the GUI 600, these being described in more detail in relation to FIG. 3.

Figure 3:
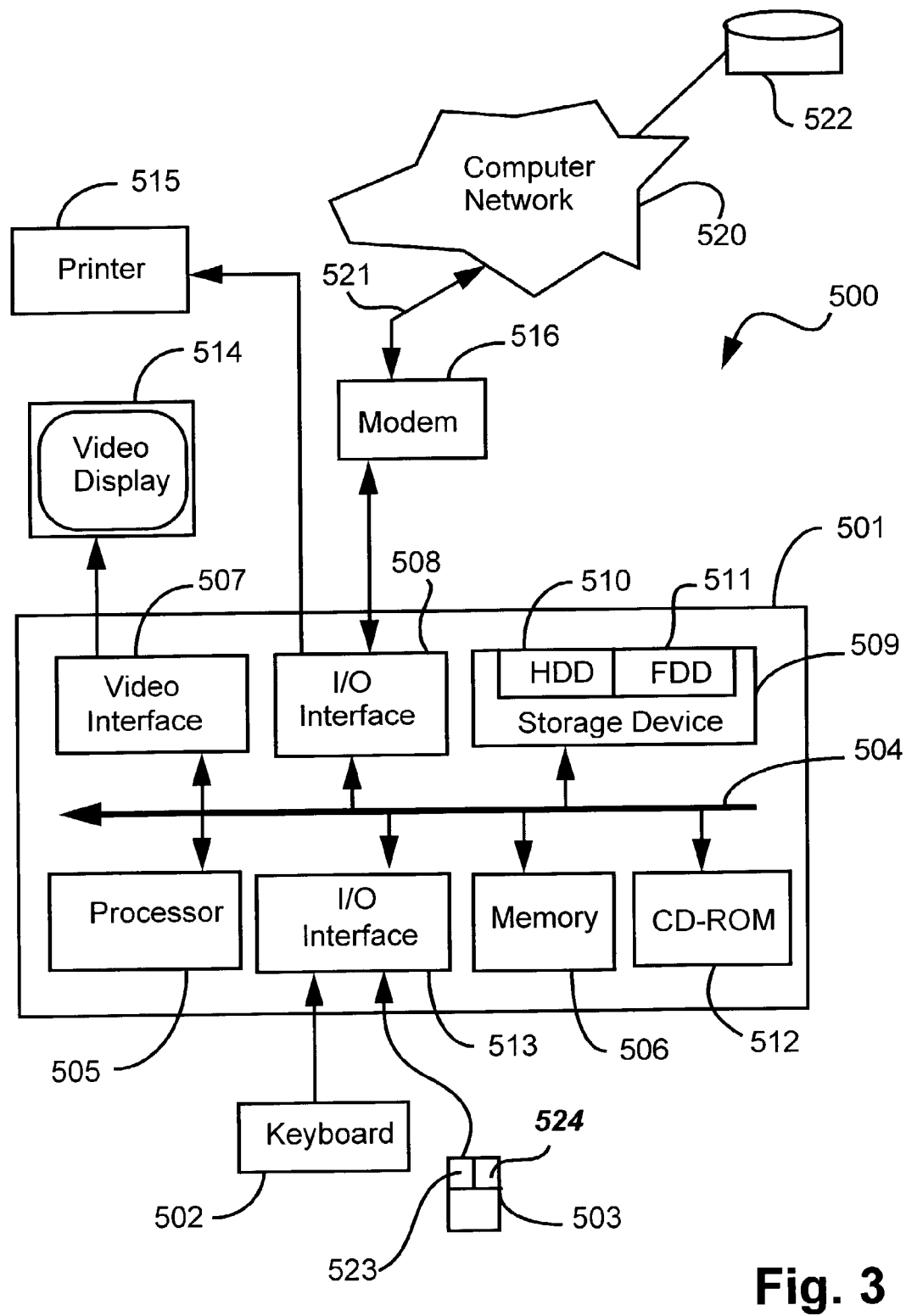
FIG. 3 is a schematic block diagram of a general purpose computer system upon which the browsing and editing system can be practiced.
Figure 6:
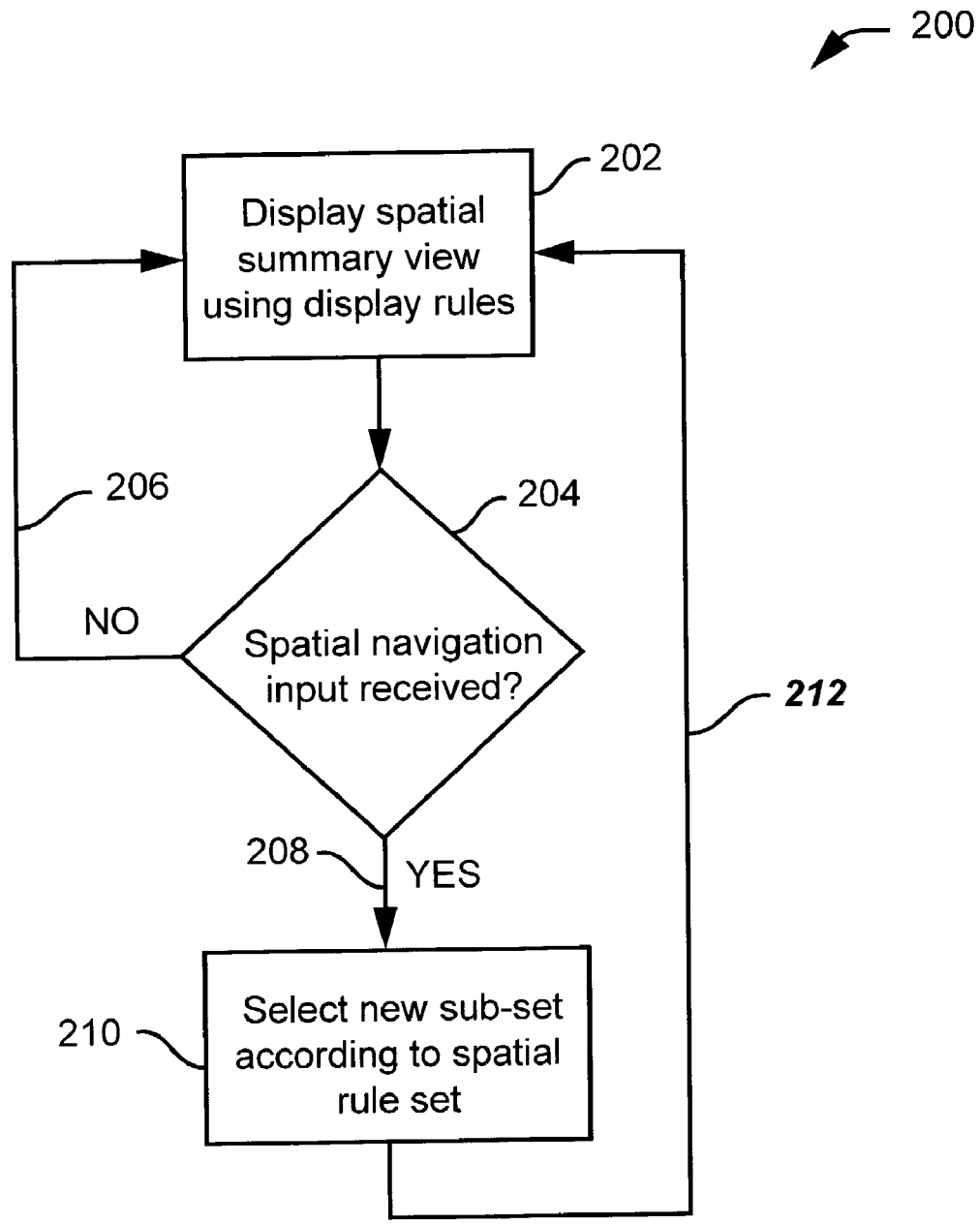
FIG. 6 depicts a process for selecting a sub-set of media items via a spatial navigation input.
Figure 7:
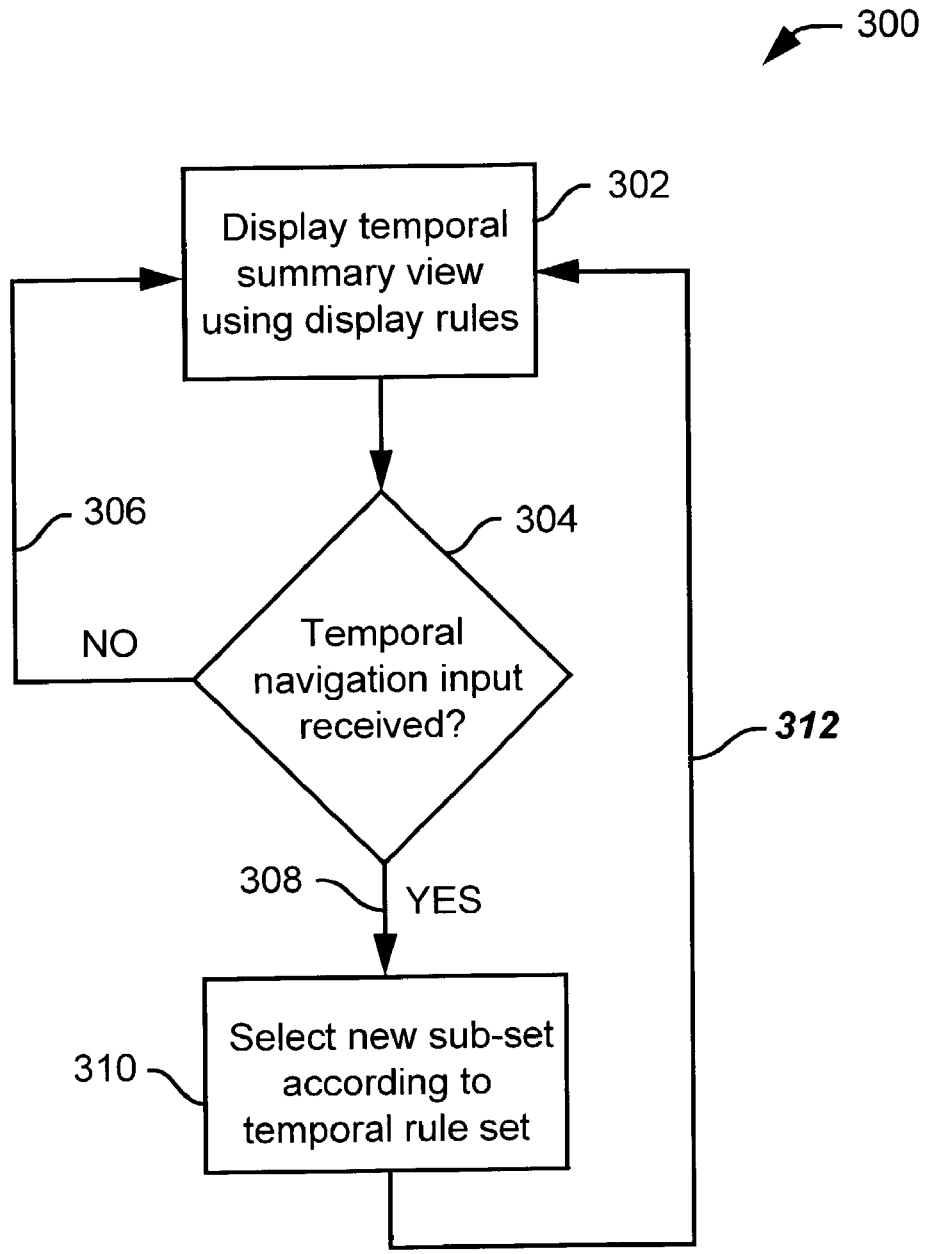
FIG. 7 depicts a process for selecting a sub-set of media items via a temporal navigation input.

The methods of navigating/browsing the set of media items 102 are preferably practiced using a general-purpose computer system 500, such as that shown in FIG. 3 wherein the processes to be described in relation to FIGS. 6 and 7 may be implemented as software, such as an application program executing within the computer system 500. Accordingly, in typical use, the set of media items 102 is generally stored on a mass-storage device within the general purpose computer 500, while the processing required to achieve the browser functionality is performed by a processor 505 in conjunction with other elements of the computer system 500. The set of media items 102 can, alternatively, be stored elsewhere, and accessed by the computer system 500 across a computer network 520 by means of a modem 516. In particular, the steps of method of navigating/browsing the set of media items 106 are effected by instructions in the software that are carried out by the computer. The software may be divided into two separate parts, one part for carrying out the navigating/browsing methods, and another part to manage the user interface between the latter and the user. The software may be stored in a computer readable medium, including the storage devices described below, for example. The software is loaded into the computer from the computer readable medium, and then executed by the computer. A computer readable medium having such software or computer program recorded on it is a computer program product. The use of the computer program product in the computer preferably effects an advantageous apparatus for navigating/browsing the set of media items 106.

The computer system 500 comprises a computer module 501, input devices such as a keyboard 502 and mouse 503, output devices including a printer 515 and a display device 514. A user typically controls the cursor 620 shown in FIG. 1 by means of the mouse 503, wherein visual feedback in regard to the position of the cursor 620 is provided by the video display 514. A Modulator-Demodulator (Modem) transceiver device 516 is used by the computer module 501 for communicating to and from a communications network 520, for example connectable via a telephone line 521 or other functional medium. The modem 516 can be used to obtain access to the Internet, and other network systems, such as a Local Area Network (LAN) or a Wide Area Network (WAN). The set of media items 102 can thus be stored in a remote data base 522 and accessed by the computer system 500 over the computer network 520 by means of the modem 516 and the connection 521 between the modem 516 and the computer network 520.

The computer module 501 typically includes at least the one processor unit 505, a memory unit 506, for example formed from semiconductor random access memory (RAM) and read only memory (ROM), input/output (I/O) interfaces including a video interface 507, and an I/O interface 513 for the keyboard 502 and the mouse 503 and optionally a joystick (not illustrated), and an interface 508 for the modem 516. A storage device 509 is provided and typically includes a hard disk drive 510 and a floppy disk drive 511. A magnetic tape drive (not illustrated) may also be used. A CD-ROM drive 512 is typically provided as a non-volatile source of data. The components 505 to 513 of the computer module 501, typically communicate via an interconnected bus 504 and in a manner which results in a conventional mode of operation of the computer system 500 known to those in the relevant art. Examples of computers on which the described arrangements can be practised include IBM-PC's and compatibles, Sun Sparcstations or alike computer systems evolved therefrom.

Typically, the application program is resident on the hard disk drive 510 and read and controlled in its execution by the processor 505. Intermediate storage of the program and any data fetched from the network 520 may be accomplished using the semiconductor memory 506, possibly in concert with the hard disk drive 510. In some instances, the application program may be supplied to the user encoded on a CD-ROM or floppy disk and read via the corresponding drive 512 or 511, or alternatively may be read by the user from the network 520 via the modem device 516. Still further, the software can also be loaded into the computer system 500 from other computer readable medium including magnetic tape, a ROM or integrated circuit, a magneto-optical disk and the like. The foregoing is merely exemplary of relevant computer readable mediums. Other computer readable media may alternately be used.

Figure 4:
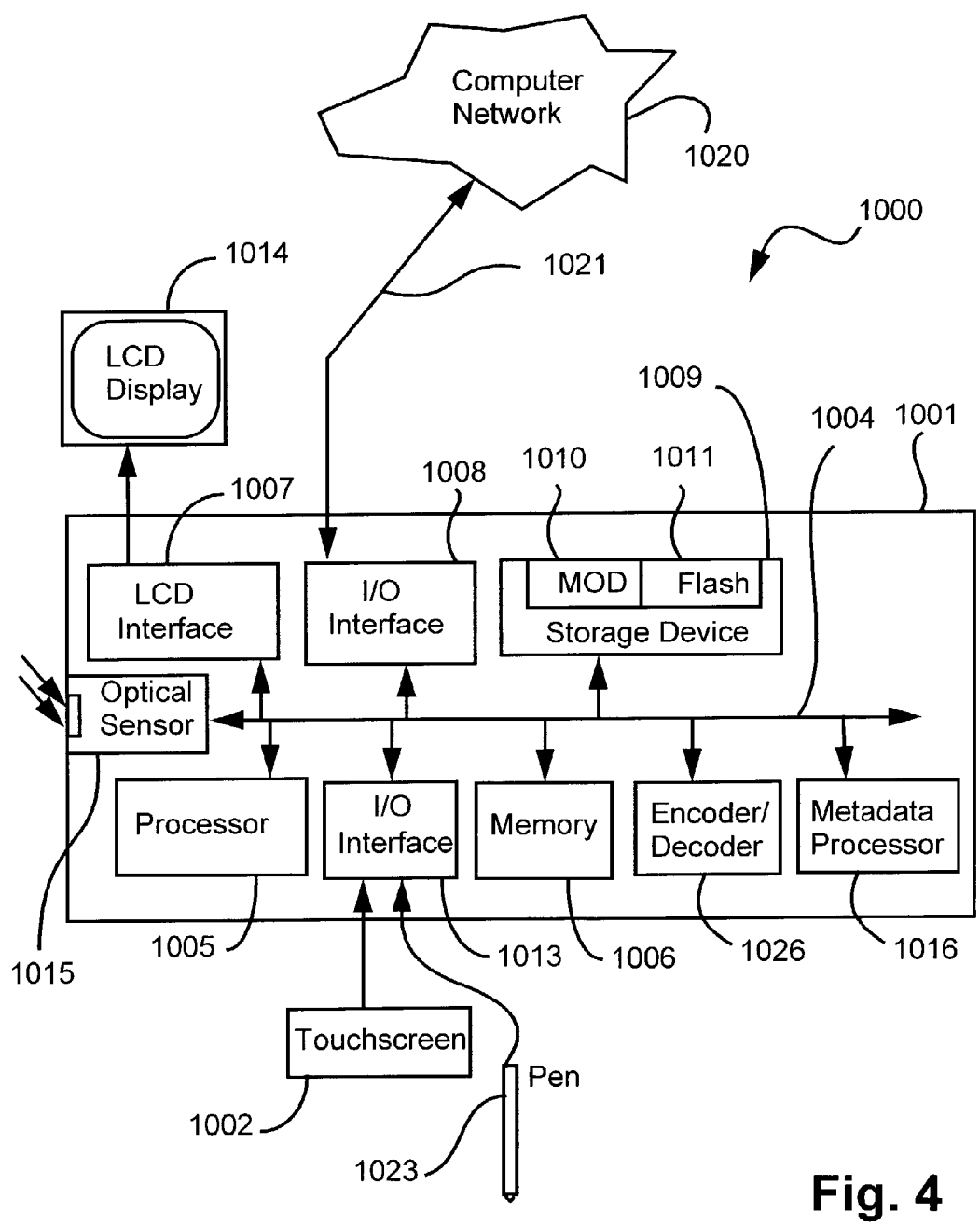
FIG. 4 is a schematic block diagram of a special purpose computer system forming part of a portable media recording device, upon which the browsing and editing system can be practised.

The methods of navigating, browsing and editing a set of media items can also be practised using a Digital Disk reCording device (DDC) 1000, such as that shown in FIG. 4, wherein the GUI system can be implemented as software, such as an application program executing within the DDC 1000. In particular, the GUI is effected by instructions in the software that are carried out by the DDC. The software may be divided into two separate parts, one part for providing the navigation and browsing functions via the GUI, and another part to manage the remaining DDC functions. The software may be stored in a computer readable medium, including the storage device as described below for example. The software is loaded into the DDC from the computer readable medium, and then executed by the DDC. A computer readable medium having such software or computer program recorded on it is a computer program product. The use of the computer program product in the DDC effects an advantageous apparatus for providing the navigating and browsing functionality via the GUI.

The DDC 1000 comprises a processor module 1001, input devices such as a touch-screen 1002 and a pen 1023, output devices including an LCD display device 1014. An I/O interface 1008 is used by the processor module 1001 for communicating to and from a communications network 1020, for example connectable via a telephone line 1021 or other functional medium. The I/O interface 1008 can be used to obtain access to the Internet, and other network systems, such as a Local Area Network (LAN) or a Wide Area Network (WAN).

The processor module 1001 typically includes at least one processor unit 1005, a memory unit 1006, for example formed from semiconductor random access memory (RAM) and read only memory (ROM), input/output (I/O) interfaces including an LCD interface 1007, and an I/O interface 1013 for the touch screen 1002 and the pen 1023, and an interface 1008 for external communications. An optical sensor 1015 is a primary input device for the DDC 1000, which also typically includes an audio input device (not shown). An encoder 1026 provides image coding functionality, and a meta-data processor 1016 provides specialised meta-data processing. A storage device 1009 is provided and typically includes a Magneto Optical Disk MOD 1010 and a Flash Card memory 1011. The components 1005 to 1013, 1015, 1016, and 1026 of the processor module 1001, typically communicate via one or more interconnected busses 1004.

Typically, the GUI system program is resident on one or more of the Flash Card 1011 and the MOD 1010, and is read and controlled in its execution by the processor 1005. Intermediate storage of the program and any data fetched from the network 1020 may be accomplished using the semiconductor memory 1006. In some instances, the application program may be supplied to the user encoded on the MOD 1010, or alternatively may be read by the user from the network 1020 via the I/O 1008. Still further, the software can also be loaded into the computer system 1000 from other computer readable medium including a ROM or integrated circuit and the like. The foregoing is merely exemplary of relevant computer readable mediums. Other computer readable media may alternately be used.

The method of navigating and browsing a set of media items may alternatively be implemented in dedicated hardware such as one or more integrated circuits performing the functions or sub functions of navigating and browsing a set of media items. Such dedicated hardware may include graphic processors, digital signal processors, or one or more microprocessors and associated memories.

Figure 5:
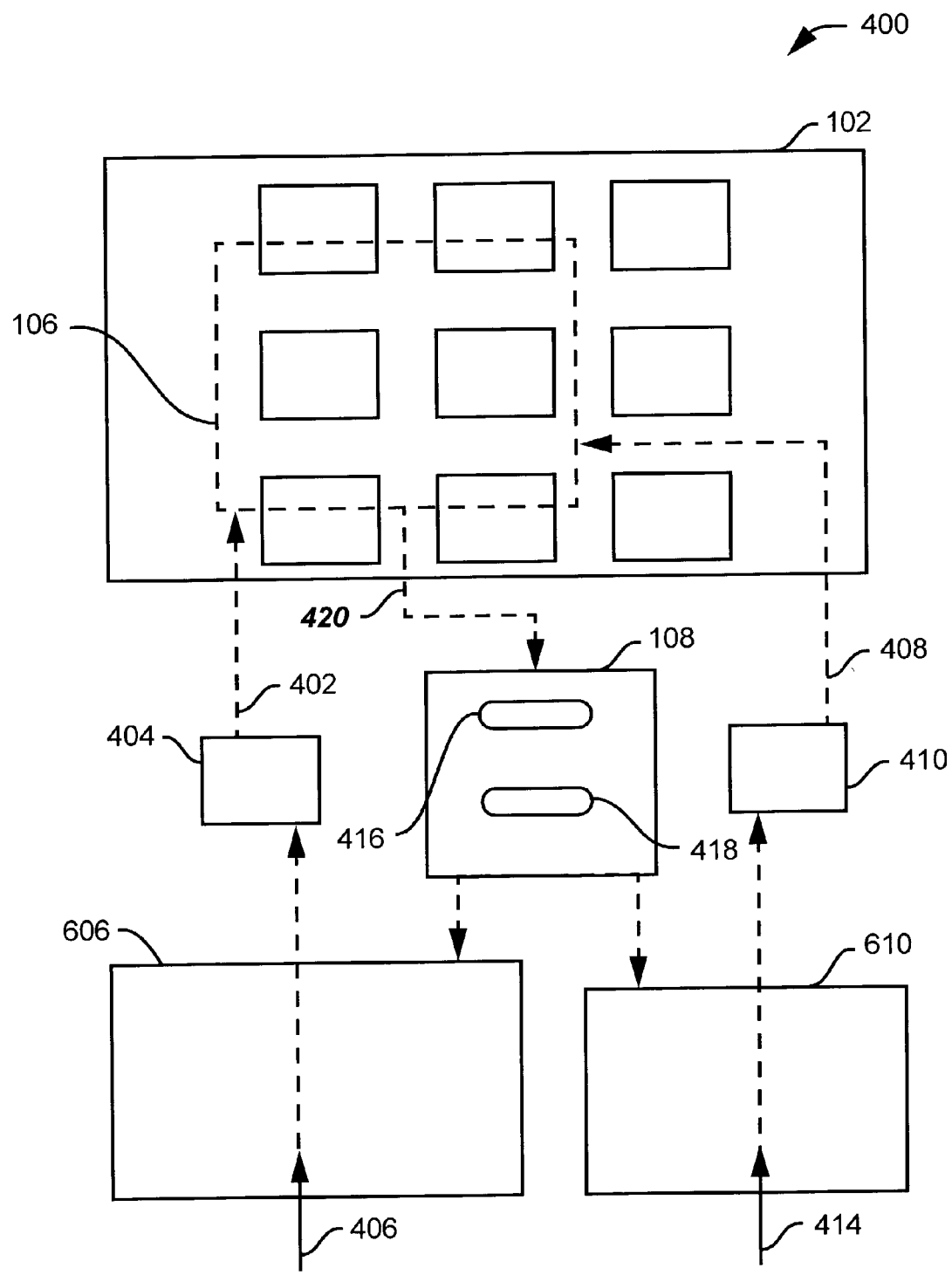
FIG. 5 depicts mechanisms for user interaction with selected media items, and effects thereof on summary displays when browsing a set of media items.

FIG. 5 shows a further view 400 of the GUI depicted in FIGS. 1 and 2. The user is able to provide a spatial navigation input 406 to the spatial summary display 606 using, for example, the keyboard 502 or the mouse 503, and this input is applied to a set of spatial selection rules 404. This in turn effects, as depicted by a dashed arrow segment 402, the selection of the sub-set of media images 106 thereby changing the "window view" the user has into the set of media items 102. From a practical standpoint, the spatial navigation input 406 can take the form of the user clicking a left-hand mouse button 523, after positioning the mouse pointer 620 inside the zoom browsing window 606, thereby indicating that the browser 600 should "zoom-in", and thus reduce the number of thumbnails 604 displayed in the zoom browsing window 606. Alternately, the user can point, using the previously described set of mouse operations, in the display area 614 outside the zoom browsing window 606, thereby indicating that the zoom browsing window 606 should "pan" across the set of media items 102 without changing the present zoom factor. The aforementioned instances of spatial navigation inputs 406 are merely exemplary, and other methods can be used by the user in order to spatially navigate around the set of media items 102.

The user is able to control the position of the mouse cursor 620 in the GUI 600 using the keyboard 502 or the mouse 503, and is able to provide control signals directed to the GUI element at the position of the cursor 620 using selected keys on the keyboard 502, or the left-hand mouse button 523.

A temporal navigation command 414 can be input to the temporal summary display 610. This input 414 is applied to a set of temporal selection rules 410, which in turn effect, as depicted by a dashed arrow segment 408, the selected sub-set of media items 106 and the window view of the set of media items 102 seen by the user. In practical terms, when the user clicks the left-hand mouse button 523 after having positioned the mouse cursor 620 within the video zoom window 610, then the currently playing clip extract forms the basis for the zoom browsing window 606 to zoom in, to an ergonomically predetermined degree, towards the corresponding thumbnail which is representative of the video clip upon which the user has left-clicked. Alternately, when the user clicks the right-hand mouse button 524 after having positioned the mouse cursor 620 within the video zoom window 610, then the currently playing clip extract forms the basis for the zoom browsing window 606 to zoom out, to an ergonomically predetermined degree, away from the corresponding thumbnail which is representative of the video clip upon which the user has right-clicked. These instances of temporal navigation are only indicative, and other methods can be used in order to temporally navigate around the set of media items 102.

It is thus seen that the user is provided with two mechanisms for navigating through the set of media items 102, these being the spatial navigational input 406 and the temporal navigational input 414. Using these two types of interaction, the user can conveniently and efficiently browse through the set of media items 102, using both her spatial and temporal sensory modalities. Both wholly encompassed thumbnails 120 and partially encompassed thumbnails 122 can be displayed in the zoom browsing window 606 and the video zoom window 610, depending upon a set of spatial extraction rules 416.

Having dealt with the means given to the user in order to provide navigation inputs to the GUI 600, we now turn to the feedback effect that those inputs have on the zoom browsing window 606, and on the video zoom window 610. It is noted that irrespective of the mechanism used to arrive at the selected sub-set 106, the resultant selection effects, via feedback to the set of display rules 108, both the spatial summary display 606 and the temporal summary display 610. The set of display rules 108 contains two distinct, but related components, namely the set of spatial extraction rules 416, and a set of video rules 418. These two sets of rules operate in concert in order to establish the relationship between the current selection 106, the current spatial summary display 606, and the current temporal summary display 610.

The spatial extraction rules 416 are concerned with the extent to which the wholly encompassed media items 120 and the partially encompassed media items 122 are mapped to the zoom browsing window 606 and the video zoom window 610. A number of different mappings are possible. In one example, the mapping is performed only in regard to wholly encompassed thumbnails 120. In this case, partially encompassed thumbnails 122 are excluded from consideration, and do not appear in one or both of the zoom browse window 606 or the video zoom window 610. Thus, although partly encompassed thumbnails 122 are shown in the selected sub-set 106, they will not appear in either or both of the zoom browsing window 606 or the video zoom window 610. In another mapping example, partially encompassed media items 122 can be included in the mapping to both the windows 606 and 610. The extent to which partially encompassed media items 122 are considered can be refined by incorporation of a pixel threshold. Thus, for example, the threshold may be set at 50% of pixel area of a thumbnail, indicating that if more than half of a partially encompassed thumbnail 122 falls outside the dashed rectangle 106, then the thumbnail 122 will be excluded from incorporation into the respective zoom browsing and video zoom windows 606 and 610. A partially encompassed thumbnail 122 is shown, if the mapping so dictates, in the zoom browsing window 606 in much the same form as it appears in the dashed rectangle depicting the selected sub-set of media items 106, and thus only a part of the partly encompassed thumbnail will appear in the zoom browsing window 606. This is a spatial representation of a partially encompassed thumbnail. A corresponding temporal representation, which appears in the video zoom window 610, displays only certain time segments of the media item represented by the partially encompassed thumbnail 122. The manipulation and presentation of media items in both spatial and temporal modalities is performed by the processors 505 and 1005 in relation to the media items 102 which are typically stored in the mass storage devices 509 and 1009.

The video rules 418 are concerned with the manner in which video clips associated with the thumbnails in the selection window 106 are displayed in the video zoom window 610. The video rules 418 can be incorporated within a template that also incorporates the spatial extraction rules 416.

Entire video clips associated with the thumbnails in the selection 106 can be played in the video zoom window 610, however this is only a practical option if the number of video clips is small, and the total playing time is relatively short. In the event that the selected sub-set 106 does not incorporate any media items from the overall set 102, a default option is for the video zoom window 610 to display a video summary of the entire set of media items 102. If only a single clip is present in the selected subset 106, then one optional display mode plays the displayed clip in its entirety, together with sync audio, but without providing summarisation of the clip.

The browsing capability of the GUI 600 is intended to provide enhanced navigation capabilities by which stored media items, for example video clips, can be browsed. Accordingly, the video content shown in the video zoom window 610 presents a navigable video summary view of the video clips which are wholly, or partially visible in the zoom browse window 606. Since the intention of the browsing capability is merely to navigate the stored media items, any template which is selected in order to produce the temporal summary 608 in the video zoom window 610 typically shows video clips in their substantially "raw" form, without significant changes thereto, such as are provided by addition of effects or transitions.

Turning to the aspect of audio content, particularly content which is sync-related to the video clips in the set 102, the sync-audio associated with each video clip which appears in the video zoom window 610 can be played together with the corresponding video clip. Alternately, a common backing track can be used, whereby individual audio segments associated with each video clip are not used. In this case, the "sync-audio" associated with each of the video clips represented by the media items in the set 102 can be replaced with a backing audio track from either a popular selection of music, or from a user-selected set of audio sources.

Other types of media items, or processes incorporating effects or transitions, can also be incorporated in the set of media items 102, and navigated using the GUI 600. Furthermore, meta data, or animations, or their media representations, can also be represented as media items, and navigated or browsed as previously described.

It can thus be seen that the user of the GUI system can switch attention between the zoom browsing window 606 and the video zoom window 610, and thereby can quickly converge on video clips of interest by the expedient of being able to see, interact with, and select video information provided substantially simultaneously in multi-dimensional form on the displays 514 and 1014. It will be recalled that although the present description refers primarily to video clips as forming the set of media items 102, the description is equally applicable to other types of media items.

The spatial summary provided by the zoom browsing window 606 can be organised by the processors 505 and 1005 to depict relationships between video clips, such as chronological ordering, "same event" clustering, or "same medium" clustering. Alternatively, the video clips can be shown in the window 606 without any relationship therebetween at all, ie., in a substantially random fashion. Relationships between video clips for display in the zoom browsing window 606 can be established through use of media filters such as, for video items, "find people", "find dark clips", and other filters. These filters, and others, can be applied to the "raw" set of media items 102, in order to establish notional spatial arrangements of media items in the set 102, in respect of which the selection frame 106 can be navigated by the user. Alternatively, the filters can be applied to the thumbnails 604 within the already selected sub-set 106 in order to establish the desired order in relation only to selected media items 604.

The video zoom window 610 provides a temporal summary of the selected set 106 of clips shown in the zoom browsing window 606. This allows the user to see the content of a selection of video clips in a rapid and convenient manner. This also enables selection, as described in relation to FIG. 5, of one of these clips for closer scrutiny.

FIG. 6 depicts a process 200 whereby a user's spatial navigation input 406 to the zoom browsing window 606 results in a change in the selected sub-set 106. The process 200 has a step 202 which displays the spatial summary view in the zoom browsing window 606 on the display 514 in accordance with the spatial extraction rules 416. The step 202 represents a static situation which will typically persist until the user interacts, using the mouse 503 or keyboard 502 for example, with the system in order to navigate among the set of media items 102. The process 200 is directed from the step 202 to a testing step 204 which determines whether a spatial navigation input 406 has been received. If no such input has been received, then the process 200 is directed in accordance with a "NO" arrow 206 back to the step 202, which maintains the display in its present form. If, on the other hand, the spatial navigation input 406 has been received, then the process 200 is directed in accordance with a "YES" arrow 208 to a step 210 which selects a new subset 106 according to a set of spatial selection rules 404 (see FIG. 5). The spatial selection rules 404 represent the manner in which the selection 106 is impacted by a spatial navigation input 406. In one case the zoom browse window 606 can zoom in under control of the processor 505, to some ergonomically predetermined degree, towards the thumbnail upon which a user has asserted a mouse click. Other spatial selection rules can also be used.

FIG. 7 depicts a process 300 by which a temporal navigation input 414 effects the selected subset of media items 106. The process 300 has a step 302 which displays the temporal summary view in the video zoom window 610 using the set of display rules 108. The step 302 represents a GUI display situation which typically persists until the user interacts with the GUI in order to navigate among the set of media items 102. The process 300 is directed to a testing step 304 which determines whether a temporal navigation input 414 has been received. If no such input has been received, then the process 300 is directed in accordance with a "NO" arrow 306 back to the step 302, thereby maintaining the current video display 608 in the video zoom window 610, which will persist in the absence of any user interaction. If, on the other hand, a temporal navigation input 414 is detected, then the process 300 is directed from the testing step 304 in accordance with a "YES" arrow 308 to a step 310 which selects a new subset 106 in accordance with the set of temporal selection rules 410. One such temporal selection rule causes the zoom browsing window 606 to zoom in, to some ergonomically predetermined degree, to the thumbnail representative of the video clip which was playing in the video zoom window 610 when the user made a temporal navigation input 414 to the video display 608. Other temporal selection rules may also be used.

Figure 15:
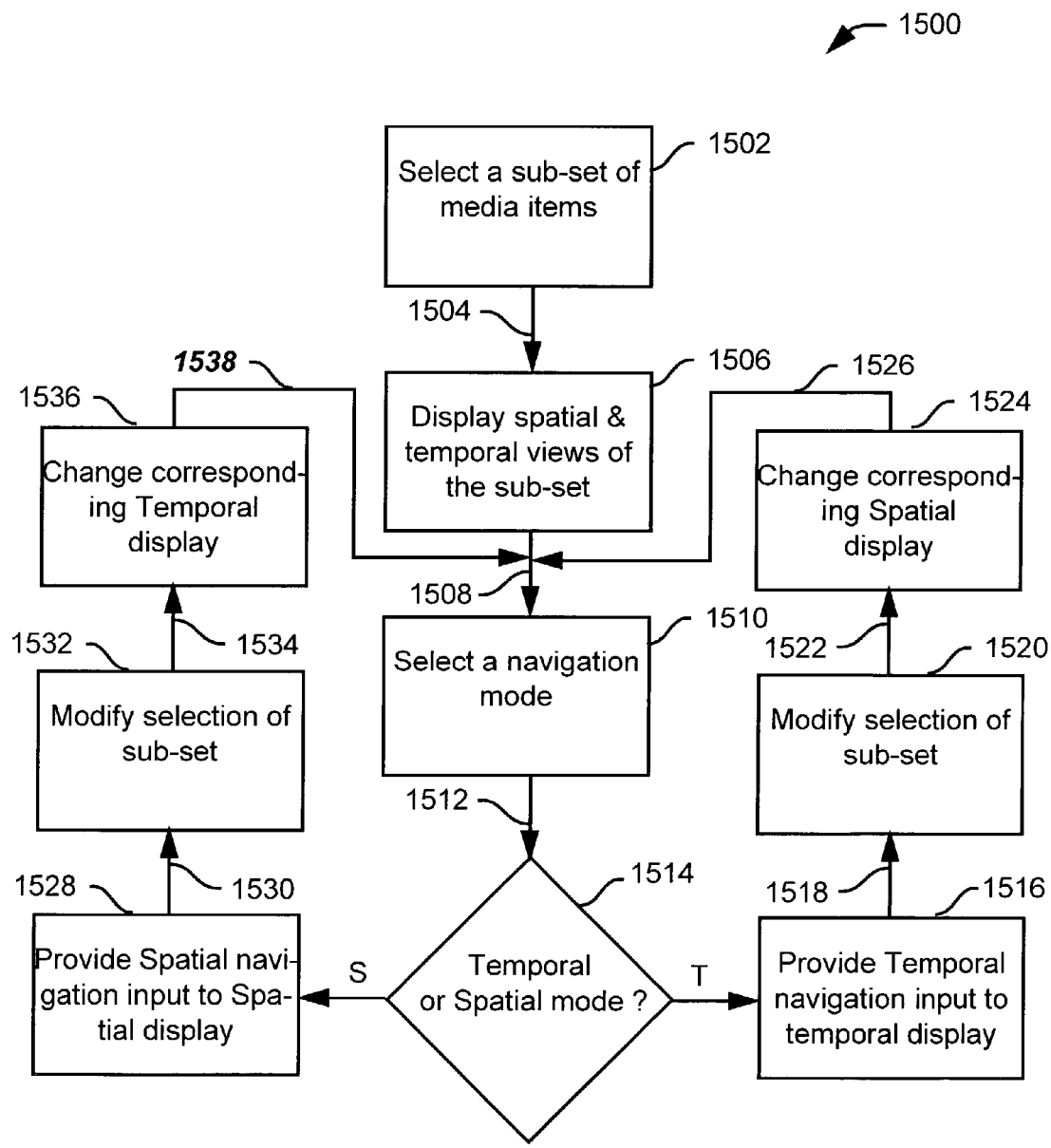
FIG. 15 shows a process for browsing a set of media items via a spatial navigation or a temporal navigation input.

FIG. 15 shows a process 1500 for navigating a set of media items using either a temporal or a spatial navigation input. The process 1500 commences with a step 1502 which selects a sub-set of media items. Thereafter, in a step 1506 spatial and temporal views of the sub-set selected in the step 1502 are displayed in respective positions on the GUI 600. Accordingly, the spatial view is presented in the zoom browsing window 606, while the temporal views are presented in the video zoom window 610. A subsequent step 1510 selects a navigation mode, the options for this mode being spatial navigation or temporal navigation. A subsequent testing step 1514 determines whether the temporal or the spatial navigation mode has been selected.

If the temporal mode has been selected, then the process 1500 is directed in accordance with a "T" arrow to a step 1516 which provides a temporal navigation input to the temporal display (ie. the video zoom window 610 in FIG. 1). Thereafter, a step 1520 modifies the selection of the subset, thereby changing the display 608 in the video zoom window 610. A subsequent step 1524 makes corresponding changes in the spatial display (ie. the zoom browsing window 606 of FIG. 1). Thereafter, the process 1500 is directed in accordance with an arrow 1526 back to the step 1510.

Returning to the testing step 1514, if a spatial navigation mode is selected, then the process 1500 is directed in accordance with an "S" arrow to a step 1528 which provides a spatial navigation input to the spatial display (ie. to the zoom browsing window 606). This is effected by moving the mouse cursor 620 in FIG. 1 to a corresponding position in the zoom browsing window 606. Thereafter, a step 1532 modifies the selection of the sub-set in accordance with the operation of the step 1528 thereby changing the display of thumbnails in the zoom browsing window 606. The subsequent step 1536 makes corresponding changes to the temporal display (ie. the video zoom window 610 of FIG. 1), after which the process 1500 is directed in accordance with an arrow 1538 back to the step 1510.

The video zoom window 610 can also show video clips at various speeds, typically being faster than normal (unity) playback speed, thereby allowing temporal compression of the video clips for rapid viewing of video content. The control of speed can be effected, for example, by skipping certain frames, and/or by duplicating other frames according to the set of display rules 108. The speed is automatically controlled as a function of the number of clips selected by the display rules 108 for display in the zoom browse window 606. The speed adjustment can, for example, operate as part of the template containing the video rules 418. The speed control can ensure, for example, that if only a few clips are in the selected subset 106, then the video display 608 in the video zoom window 610 plays at substantially unity speed. If, on the other hand, the number of clips in the selected subset 106 is large, then the video display 608 can be played more rapidly. This ensures that the period of a video cycle within the video zoom window 610 is approximately constant, irrespective of how many clips are selected in the sub-set 106. The speed control decisions and rules can be implemented as part of the template encompassing the video rules 418 and/or the spatial extraction rules 416.

The following description, referred to as Example "A", which includes pseudo-code fragments, provides an example of temporal summary display rules based upon a user's spatial selection input 406. The pseudo-code fragments could be a functional element in the video rules 418. The effect of this pseudo-code is to produce a temporal display 608 in the video zoom window 610 which has a duration of between thirty seconds and two minutes, substantially irrespective of the number of media clips selected for display by the user in the browsing window 606 or 610.

In the first instance, a number of initialising steps are performed, relating to (i) the order in which video clips are to be presented, (ii) the type of inter-clip transitions to be used, (iii) the base frame rate, (iv) a reference to a background audio item, (v) muting of the sync, audio associated with the clips, and (vi) the manner in which wholly and partially displayed clips are mapped into the temporal display. These initialising steps are stated as follows:

| | |
|---|---|
| Order: | Maintain user's selection order, or alternatively, maintain chronological or record-time order. |
| Transitions: | 4-frame crossfade between each cut clip in D3CLIPSET, or lesser duration crossfade for cut clips less than 4 frames in duration. |
| Base Frame Rate: | 25 frames per second |
| Audio: | \\vaccai\d\projects\vp_dc\templates\trailers\quick_look\audio\PretAPorter_2_11. |
| Sync audio: | mute |
| Selection: | Partition clip selection according to these thresholds of selected spatial thumbnail area:<br>>=75% selected => "multiplier" = 1.0<br>75% > selected >= 40% => "multiplier = 0.5<br>40% > selected >= 0% => "multiplier = 0.0 |

Having established the initialising conditions, the following pseudo-code fragment establishes a set of "Default" clip cutting rules, which are referenced in the subsequent "General Cutting Rules", on a per-clip basis, for example in step 2 thereof. Accordingly, the default cutting rules are set out as follows:

Cut clip to (05:00*"multiplier") seconds duration from 1 second point after clip start, or if raw clip duration is less than the total of (05:00*"multiplier"+1) seconds then cut (05:00*multiplier) seconds from the end or retain whole clip and apply "multiplier".

Speed up the cut sub-clip 50% so that the (05:00*multiplier) second clip has a new duration of (05:00*multiplier)/2 seconds (or equivalent operation for other cut clip durations). Use frame-dropping techniques, or where available with adequate performance, use in-betweening techniques to create merged frames.

Having established the default clip cutting rules, the following pseudo-code fragment establishes the general cutting rules, which are applied across the entire production:

1. Calculate "ORIGINAL RAWTIME" duration (total duration of raw, uncut, selected clips.)
2. Apply "Default" cutting rules to each selected clip, producing "D1CLIPSET"
3. Calculate "D1 RAWTIME" to determine total duration of "D1CLIPSET" resulting from "Default" cutting rules
4. Do while "D1 RAWTIME">2 minutes, Remove alternate cut clips
5. 30 seconds–"D1 RAWTIME"="D2TIME"
6. If "D2TIME"<=0 then Result: D3CLIPSET, end.
7. "D2TIME" divided by 12 frames="D2CUT"
8. Calculate "D2RAWTIME", "ORIGINAL RAWTIME"–"D1 RAWTIME"="D2RAWTIME",
9. Evenly divide "D2RAWTIME" using "D2CUT" value
10. Extract 12 frame duration clips "D2CLIPSET" from "D2RAWTIME" and place them chronologically with "D1CLIPSET"
11. Result: D3CLIPSET
12. If D3CLIPSET<30 SECONDS, time-stretch the results to equal 30 seconds Returning to FIG. 1, it is noted that currently displayed thumbnails 604 in the zoom browse window 606 which are selected by the user via the control inputs 406 or 414 can be highlighted using graphical techniques such as addition of a colour outline, use of a blended colour across the thumbnail and so on. One example of highlighting is use of the selection frame 618 which surrounds the selected thumbnail 616 in FIG. 1.

The video display 608 in the video zoom window 610 can be composed from a "moving cut" window within the relevant video clips corresponding to the thumbnails 604 in the zoom browsing window 606. The moving cut window ensures that each successive cycle of the video display 608 in the video zoom window 610 shows slightly different content from most, or all, input thumbnail clips 604. Thus, for example, if the moving cut window progresses from near the beginning of each input clip, to near the end of each input clip in a progressive manner, then for each successive cycle of the video display 608 in the video zoom window 610, all input clips from the zoom browsing window 606 will advance in time, showing progressively later material until their respective cut windows cycle back to the beginning of the video clips.

The following pseudo-code representation, referred to as Example "B", provides an example of summary display rules which can be incorporated into the set of video rules 418 for providing a cyclic, progressive temporal summary display 608 in the video zoom window 610 according to the moving cut technique, based upon a users spatial selection input. These rules move the moving cut window in increments of 20% of the total clip duration, thereby providing five successive offset positions.

Initialising steps are also performed in this case, these initialising steps being the same as those for the temporal summary display rules, apart from one additional initialising step relating to the manner in which the moving cut window cycles. The additional initialising step is stated as follows:

| | |
|---|---|
| Cycle: | Repeat 5 times with successive "offset" = 0%, 20%, 40%, 60%, 80% and then cycle back to 0%. |

Having established the initialising conditions, the subsequent pseudo-code fragment is the same as for the temporal summary display rules, apart the following additional set of default cutting rules relating to the moving cut window which replace the first portion of the default cutting rules in Example "A":

Cut clip to (05:00*"multiplier") seconds duration from ("offset"*raw clip duration) seconds after clip start, or if ("offset"*raw clip duration) seconds is less than the total of (05:00*"multiplier") seconds then cut (05:00*multiplier) seconds from the end or retain whole clip and apply "multiplier".

Having established the default clip cutting rules, the general cutting rules are the same as those for the temporal summary display rules.

The temporal zoom-in feature temporally expands the video display 608 in the video zoom window 610 around a point in time at which the user clicks on a video clip in the video zoom window 610 (thereby providing a temporal navigation input 414). This feature can be effected, for example, by clicking the left-hand mouse button 523 when the mouse cursor 620 is directed to the relevant clip showing in the video zoom window 610. The result of this operation is to modify the selection 106 of media items by the temporal selection rules 410 as indicated by the dashed arrow 408, thereby changing the input 420 to the display rules 108, and consequently, changing the subsequent spatial summary display 606 and the temporal summary display 610. Thus, for example, the temporal navigation input 414 is processed by the temporal selection rules 410, in the form, for example, of a temporal summarisation template, thereby causing a pan or a zoom into the selected clip which is presently showing in the video zoom window 610. This changes the selected subset 106, providing a different window view of the set of media items 102 in the zoom browsing window 606. The increased exposure resulting from the temporal zoom-in is provided at the expense of providing fewer video clips for summarisation, this being reflected in the smaller number of clips appearing in the selection 106. The video clip which has been pointed to by the user in the video zoom window 610 accordingly has more visual exposure than it had prior to the selection operation.

In contrast to the zoom-in operation, it is possible for the user to perform a "zoom-out" operation directly in the video zoom window 610, by similarly clicking in the window 610 with the right-hand mouse button 524. In this case, the set of display rules 108 displays less material from the individual clip being pointed to, due to the increased number of input clips being incorporated in the selection 106, this effect being conveyed to the display rules 108 as depicted by a dashed arrow 420, the control having been provided by the temporal navigation input 414 and the temporal selection rules 410. This results in a greater summarisation, and can also be accompanied by an increase in playback speed of the additional material being incorporated.

The following pseudo-code fragment, referred to as Example "C", typically incorporated into the temporal selection rules 410, implements navigation of the set 102 resulting from temporal navigation commands 414 by the user in respect to the temporal summary display 610. This pseudo-code fragment relates in particular to the temporal zoom-in feature which is activated when the user provides a temporal navigation input 414 in the video zoom window 610.

The following "Repeat" code makes the clips shown in the temporal display loop continuously.

Repeat: D3 CLIPSET

The next section of pseudocode uses the temporal input from the user to determine which clips have been selected:

1. If user input detected, e.g. mouse-click, calculate USER-TIME=(user input time−last cycle start time of D3CLIPSET). Use a resolution of ⅒ second.
2. Make user latency compensation: SETPOINT=(USER-TIME−0.25 second).
3. SELECTPOINT=IF SETPOINT>=0 THEN (D3CLIPSET_START+SETPOINT) seconds; ELSE (D3CLIPSET_END+SETPOINT) seconds.
4. Identify CUTCLIP portion of D3CLIPSET indexed by SELECTPOINT, i.e. ID_cutclip (SELECTPOINT).
5. Identify original "CENTRE RAWCLIP" from which CUTCLIP was derived i.e. "CENTRE RAWCLIP"=ID_raw (CUTCLIP).
6. Set NEW_SELECTION to be the range of all original raw clips in current selection, based on selection sequence or chronological sequence, whichever is active, irrespective of whether they appear in D3CLIPSET or not. I.e. NEW_SELECTION=ALL RAW CLIPS in sequence of current selection, between, inclusive ID_raw (ID_cutclip (SELECTPOINT−25%*D3CLIPSET)) and ID_raw (ID_cutclip (SELECTPOINT+25%*D3CLIPSET)).
7. Result is NEW_SELECTION and/or "CENTRE RAWCLIP" depending on layout summary display mode.

The next section of pseudocode determines, from the clips which have been selected, which clips are actually displayable. This code acts as layout rules for the temporal selection, and can be incorporated into the video rules 418 (see FIG. 10):

8. If mode is "SPATIAL_NO_REORDER" then read "CENTRE RAWCLIP" value and reduce selection area by approximately ½, replacing current selection, and zoom in by magnitude 2 to conserve same visible portion of display for selected media.
9. Else, if mode is "SPATIAL_REORDER" then read NEW_SELECTION range and "CENTRE RAWCLIP" value, arrange NEW_SELECTION sequence of media in spatial display area with "CENTRE RAWCLIP" in approximate centre of spatial sequence, replace current selection with NEW_SELECTION and zoom in such that only NEW_SELECTION is visible in spatial display area.
10. Execute temporal display summary.

The constants "SPATIAL_NO_REORDER" and "SPATIAL_REORDER" in the above pseudo-code fragment establish the native behaviour or the currently selected behaviour of the spatial display. As described in relation to FIG. 9, this behaviour relates to the ability to reorder clip thumbnails into new rectangular arrangements.

Figure 8:
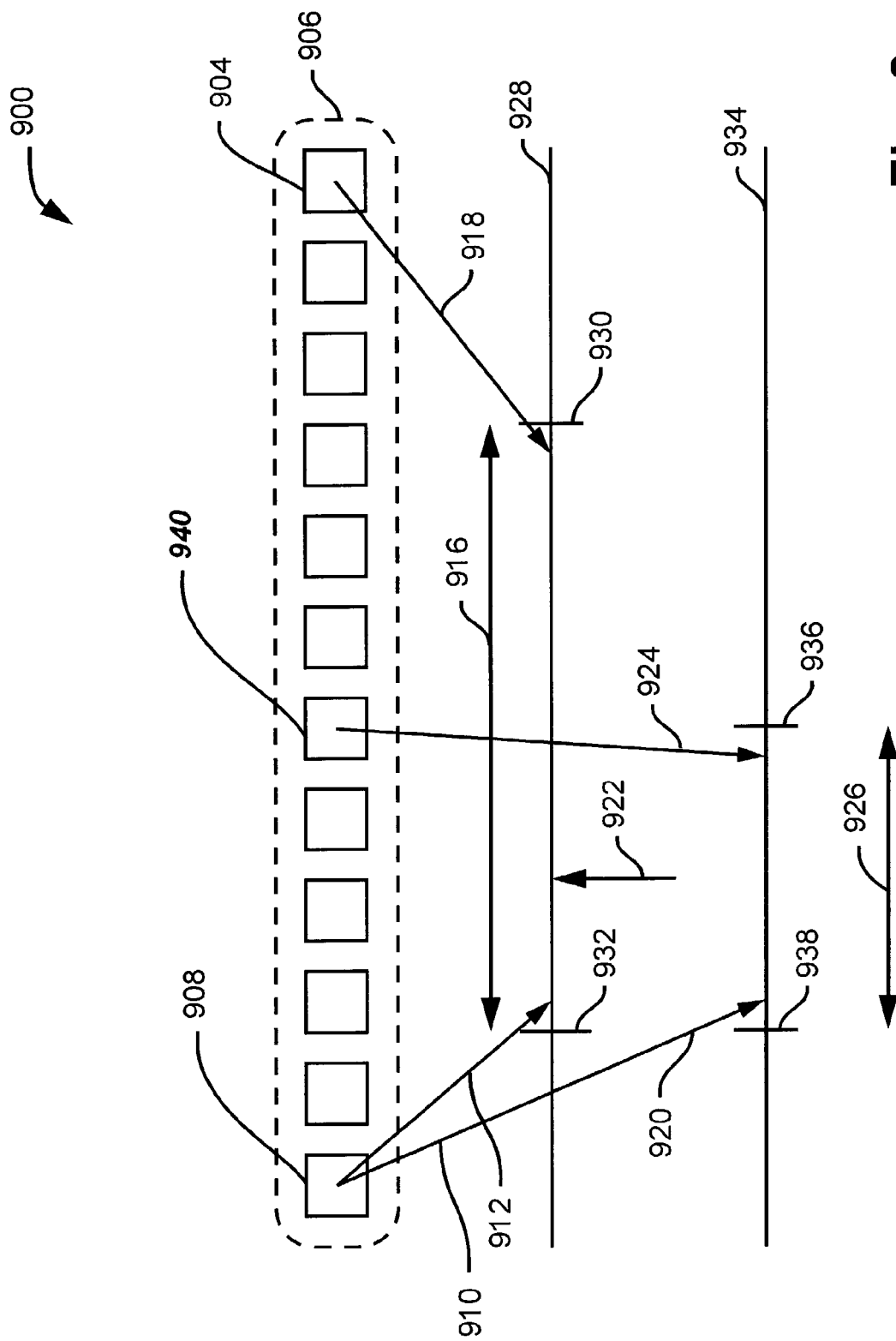
FIG. 8 shows a zoom-in operation as applied to a sequence of media items.

FIG. 8 shows a subset of media items 906 which are displayed in the video zoom window 610. The subset of media items 906 is considered to be mapped to a segment of a line 928 falling between a left-hand marker 932 and right-hand marker 930. Each media item in the subset 906 is, accordingly, mapped to a particular position on the aforementioned line segment, and thus the media item 908 is mapped in accordance with an arrow 912, and a media item 904 is mapped in accordance with an arrow 918. The aforementioned line segment has a length 916, which is indicative of the number of media items in the subset 906. These media items are displayed in the video zoom window 610 in a cyclic manner, commencing with the clip 908, and progressing in a rightward manner to the clip 904, and then recommencing with the clip 908 and so on. The time duration of a single cycle of the temporal display in the video zoom window 610 is substantially constant as has been described in relation to the automatic speed control function. When the user activates the zoom-in function at a time instant corresponding to a point in the line segment depicted by an arrow 922, the temporal selection rules 410 determine which clip in the subset 906 has been selected, and zoom in on that clip, including in the new view, for example, 25% of the clips in the subset 906 on either side of the selected clip. Accordingly, whereas twelve media items in the subset 906 are mapped to the segment of the line 928 falling between the markers 932 and 930, only six of these clips are mapped to a segment of a line 934 lying between the markers 938 and 936 as a result of the zoom-in operation. The length of this latter line segment is depicted by an arrow 926 and is proportional to the number of media clips which have been mapped to the corresponding segment of the line 934. Although the number of clips mapped to corresponding segments of the lines 928 and 934 differ, the time duration of a cycle of temporal display in the video zoom window 610 is approximately the same in each case.

The specific impact that a user input 414 has on the display in the zoom window 606 depends on whether the zoom browsing functionality includes a media item "re-ordering" capability or not. If the spatial extraction rules 416 have a re-ordering capability which can be used in controlling the display of media items 604 in the zoom browsing window 606, then the clips which have been mapped to the segment of the line 934 between the markers 938 and 936 can be shown, exactly, in the zoom browsing window 606, by re-ordering thumbnails into the required two dimensional sequence arrangement in the zoom browsing window 606. If, however, the spatial extraction rules 416 are not able to re-order the contents of the zoom browsing window 606, then the spatial extraction rules 416 will determine an approximate selection from the clips in the aforementioned line segment (depicted as having the length 926), and display the approximation of the selection in the zoom browsing window 606. The aforementioned approximate selection will also be provided to the set of video rules 418, which in turn cause the temporal display in the video zoom window 610 to be a temporal summary based not on the precise selection depicted by the arrow 926, but rather based upon a selection influenced by the spatial extraction rules 416 and merely approximating the selection depicted by the arrow 926.

Figure 9:
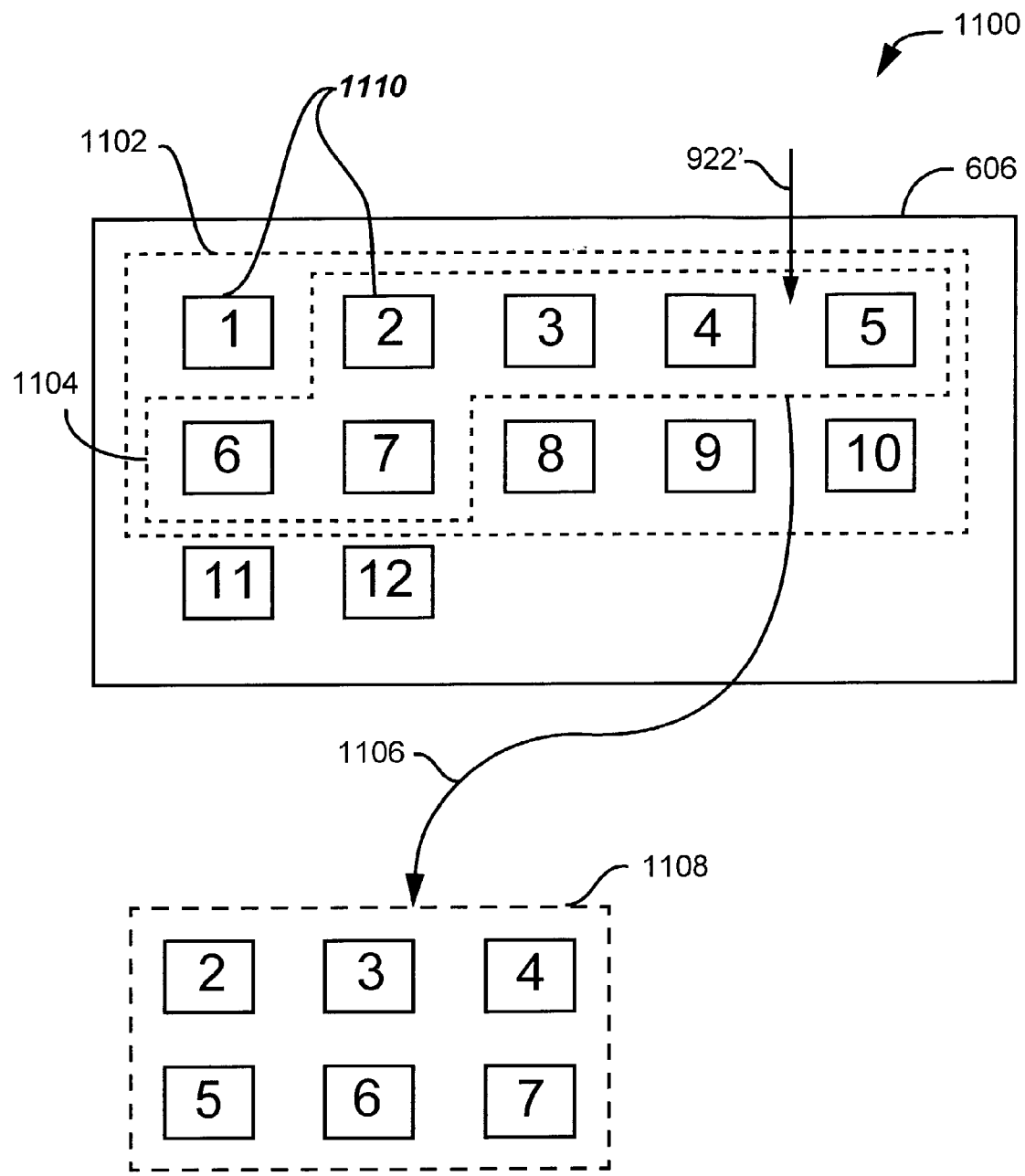
FIG. 9 shows the effects of the re-ordering capability of the spatial extraction rules.

FIG. 9 shows the effects of the re-ordering capability of the spatial extraction rules 416 on the contents of the zoom browsing window 606. FIG. 9 shows the zoom browsing window 606 containing a number of media items 1110 which are consecutively numbered from 1-12 in left-to-right raster-scan fashion. An arrow 922' depicts the time instant to which the user has zoomed in to the video zoom window 610 as depicted by the arrow 922 in FIG. 8. As described in relation to FIG. 8, three clips are selected on either side of the selection arrow 922', these clips having associated numerals 2-7 respectively, and being encompassed in a dashed outline 1104. If the spatial extraction rules 416 are able to re-order the clips in the zoom browser window 606, then the selection in the dashed box 1104 will be re-ordered, as depicted by an arrow 1106, to an array having a rectangular shape depicted by a dashed box 1108. If, on the other hand, the spatial extraction rules 410 do not have a re-ordering capability, then the rules 416 will form an approximation of the selected clips 2-7, by displaying the clips 1-10 as contained in a dashed box 1102. In this event, the set of clips 1-10 will fill the zoom browsing window 606, and the clips 11 and 12 will no longer be displayed. In the non re-ordering case, it is seen that the zoom browsing "spatial" capability determines the ultimate set of clips which are displayed to the user, and it is this set of clips which will be used in providing the temporal summary in the video zoom window 610.

The integration of spatial and temporal sensory modalities in the GUI 600 enables the user to browse and navigate through multi-media material more effectively than is possible using traditional approaches. The GUI can also be used to facilitate provision of an "edit-view" capability which provides an advantageous technique for editing media items. Provision of integrated temporal and spatial views of multi-media material, in a substantially simultaneous manner on the GUI 600, when combined with an editing capability, provides an automatic, substantially immediate, and continuous preview of results of an edit, while the edit is actually being composed or modified, without the user having to cease working on the edit in order to conduct a preview.

The term "substantially simultaneous" in this context can be understood by the following example. Consider that an editing operation is performed upon a selected sub-set of media items, to thereby form, after an editing processing delay $T_1$, an edited version, or at least a viewable segment of the edited version, of the aforementioned selected sub-set of media items. A temporal summary of the edited version or viewable segment thereof is displayed in the video zoom window 610 after a display processing latency $T_2$. The total delay, comprising $T_1+T_2$, which elapses between the performance of the editing operation and the display in the video zoom window 610 is, provided the system processing speed is sufficiently high, "substantially simultaneous" having regard to human perception.

The GUI 600, when providing only the browsing and navigating functionality, enables the user to navigate and browse through the set of media items 102, but does not enable the user to create a record depicting either the presently selected sub-set of media items 106 at a point in time, or a history of previously selected sub-sets 106 which have been produced during the browsing exercise. When the editing functionality is incorporated into the GUI 600, this adds a mechanism for storing a record which defines either, or both, the presently selected sub-set 106, and a historic record of previously selected sub-sets 106. Incorporation of editing functionality into the GUI 600 is typically accompanied by addition of a graphical timeline or playlist icon into the GUI display window 602. The timeline/playlist icon is not explicitly shown in the GUI example of FIG. 1. The user can both navigate through the set of media items 102, and by using a process which can be directed by an auto-edit template, can develop an edited selection thereof, while being provided with an automatic, substantially immediate, and continuous view of results of an edit, while the edit is actually being composed. The edited output material can be used either alone, or as raw material for a subsequent presentation, or further post editing operations.

The editing arrangement which will be described, which is termed the "edit-view" technique, provides a substantially immediate view of the output results from the editing process, where the editing process has been applied to a selection of input clips chosen by the user. The output from the "edit-view" process is called an "edit-view production".

In general, an "auto-edit" template is used to effect the desired editing, although a substantially manual editing process can also be used. Templates can incorporate rules which support performance of a variety of functions, from provision of brief video clip overviews, through to incorporation of special effects, inter-clip transitions, and other techniques in order to import desired visual impacts such as "adventure-type" effects into presentations. The user can select, from an available set of templates, a desired template which encapsulates the video rules 418 in order to provide a desired genre of video display 608 in the video zoom window 610. The spatial extraction rules 416 can also be incorporated into the same template, or alternately into a different template. The template(s) constitute the set of display rules 108.

The edit-view approach allows the user to repeatedly update the selection of input clips by addition of new clips, replacement of clips and deletion of clips therefrom. The user can also change the auto-editing template being used. Implementing any of the aforementioned changes produces a substantially immediate display of the corresponding output results in the context of an ongoing cyclic display of the selected media items 106. In this manner, the user can make frequent editing iterations, and is indeed encouraged to attempt many varying combinations and options, since the effect of these changes is substantially immediately displayed without any operational complexity relating to provision of the display.

In another arrangement of the edit-view approach, a temporal summary, which is referred to as an "edit-preview" of the edit-view production is provided, instead of the "entire" edit-view production itself. This temporal summary is to be distinguished from the temporal summary that is provided in the video zoom window 610 when the user is merely browsing the set 102 of media items. This edit-preview summary can also be produced by a template, possibly being the same template as would produce the edit-view production, but operating in an alternative mode which is selected by the user. Alternatively, a different, but related micro-template associated with the previously selected edit-view template can be used for production of the edit-preview summary.

The edit-preview mode is intended to provide to the user a temporal summary of the edit-view production, this temporal summary being typically reduced in duration, but retaining significant aspects of the edit-view production. The output from the edit-preview mode is called an "edit-preview production". Accordingly, the edit-preview production would include similar transitions and effects, for example, as well as similar title styles and backing music as the full edit-view production. The summary-mode template, or alternatively the micro-template used to produce the edit-preview can use reduced spatial resolution of the video production, reduced colour resolution of any effects or transitions, and reduced duration of any, or all video or still image and audio components of the edit-view production in order to temporally summarise the edit view production, thereby forming the edit-preview production. The aforementioned reductions are intended to provide the user with an exceptionally quick summary of the edit-view, irrespective of the total duration of the full edit-view production. Furthermore, substitution of some effects and transitions with similar, but less processor-intensive attributes, and the reduction in spatial resolution, allow more rapid production and more immediate feedback of the edit-preview to the user.

The edit-preview function can alternatively be performed by summarising an edit-view production through a further (i.e. additional) summarisation template, similar to the video rules 418. This approach requires, however, additional processing, and is not the preferred approach.

There is a significant difference between the feedback operation in the edit-view and edit-preview modes, when compared to the feedback provided in the browsing mode. Referring back to FIG. 5, it is seen that when a user provides a spatial navigation input 406 or a temporal navigation input 414, these inputs feed forward via the set of spatial selection rules 404 and the set of temporal selection rules 410 respectively in order to effect the selection 106 of the media items for display. Consequently thereto, the selection 106 feeds back as depicted by an arrow 420 to the display rules 108, and consequently, changes both the spatial summary display 606 and the temporal summary display 610.

Figure 10:
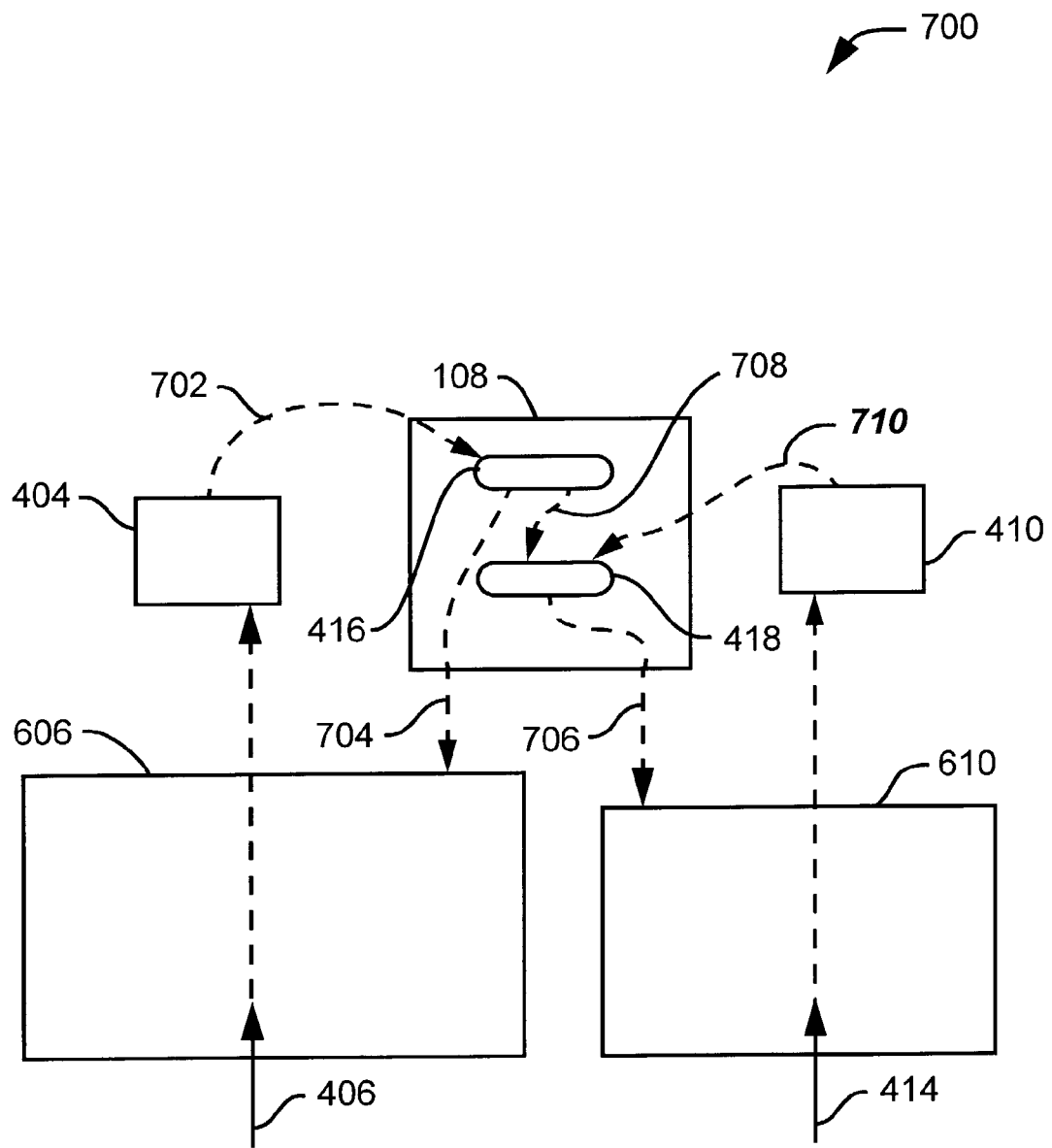
FIG. 10 shows a feedback arrangement for the edit-view and edit preview modes.

FIG. 10 shows the feedback arrangement for the edit-view and edit preview modes, and it is seen that the feedback arrangements are somewhat different to those shown in FIG. 5. Accordingly, the spatial and temporal navigation inputs 406 and 414 respectively still feed forward to respective navigation and video rules 404 and 410. However, the spatial selection rules 404 feed back as depicted by a dashed arrow 702 to the spatial extraction rules 416, and thereafter, affect the display in the zoom browsing window 606 as depicted by a dashed arrow 704. The spatial selection rules 404 also feed back to the video rules 418 as depicted by a dashed arrow 708, thereby affecting the display in the video zoom window 610 as depicted by a dashed arrow 706. In contrast, however, the temporal navigation input 414 is fed via the temporal selection rules 410, and a dashed arrow 710 to the video rules 418, and subsequently to the display in the video zoom window 610 via the dashed arrow 706. In summary, whereas the spatial navigation input 406 feeds back to affect the display in both the zoom browsing window 606 and the video zoom window 610, the temporal navigation input 414 feeds back only to the display in the video zoom window 610.

It is thus possible for a user to zoom into, and explore, portions which constitute regions of interest of an edit-preview production. The edit-preview template will automatically display proportionately more of a temporal portion selected by the user, and will display correspondingly less of other temporal portions. The quality of effects in the region selected by the user can also be optionally increased. Thus, for example, as a user zooms into a temporal locality, the edit-preview rules relating to that locality can converge on the edit-view rules, thereby providing a substantially "entire" view of the edit-view production in the selected locality.

The interactive zooming can be performed by the edit-preview template which modifies its cutting rules preferentially for the temporal region of the output production, which has been selected by the user.

The following pseudo-code process, which is referred to as Example "D", describe user selection within the edit-preview summary display, this mode providing for zooming functionality within an edit-preview template. This example is similar to Example "C", however the present example also incorporates the zooming functionality.

The following pseudocode fragments perform initialisation of the process:

| Repeat: | D3 CLIPSET |
| Initialise: | ZOOM_FACTOR = 1 |
| | CENTRE_RAWCLIP = 0 |

The following pseudocode fragments establish which clips have been selected, and also establish a zoom-factor. It is noted that the pseudocode in the following paragraphs 11-15 is identical to the pseudocode in paragraphs 1-5 of Example "C". However, the pseudocode in the subsequent paragraphs 16-18 is additional thereto, and deals with determination of the zoom-factor:

11. If user input detected, e.g. left mouse-click, calculate USERTIME=(user input time−last cycle start time of D3CLIPSET). Use a resolution of $1/10$ second.
12. Make user latency compensation: SETPOINT= (USERTIME−0.25 second).
13. SELECTPOINT=IF SETPOINT>=0 THEN (D3CLIPSET_START+SETPOINT) seconds; ELSE (D3CLIPSET_END+SETPOINT) seconds.
14. Identify CUTCLIP portion of D3CLIPSET indexed by SELECTPOINT, i.e. ID_cutclip (SELECTPOINT).
15. Identify original CENTRE_RAWCLIP from which CUTCLIP was derived i.e. CENTRE_RAWCLIP=ID_raw (CUTCLIP).
16. ZOOM_FACTOR=ZOOM_FACTOR*2
17. If ZOOM_FACTOR>4 then ZOOM_FACTOR=4
18. Result is CENTRE_RAWCLIP and ZOOM_FACTOR.

The following pseudocode exemplifies zoom-modified edit-preview template cutting rules which provide for the zoom functionality characteristic of this display mode:

1. Detect Video Highlight frames for each clip:
2. If preferential media item==0 then crop clip to 08:00/(3) sec. [referred to as a highlight clip] with highlight frame at 2/(3) seconds of duration. Divide remaining portions of clip into "new" clips; apply the same cutting/time re-mapping sequence 8-sec/(3) clips with a 4-sec/(3) gap between each.
3. else if clip not equal to centre_rawclip and not adjacent to centre_rawclip then crop clip to 08:00/(zoom_factor ^2) sec. [referred to as a highlight clip] with highlight frame at 2/(zoom_factor^2) seconds of duration. Divide remaining portions of clip into "new" clips; apply the same cutting/time re-mapping sequence 8-sec/(zoom_factor^2) clips with a 4-sec/(zoom_factor^2) gap between each.
4. else if clip is adjacent to centre_rawclip then crop clip to 08:00/2 sec. [referred to as a highlight clip] with highlight frame at 2/2 seconds of duration. Divide remaining portions of clip into "new" clips; apply the same cutting/ time re-mapping sequence 8-sec/2 clips with a 4-sec/2 gap between each.

5. else clip is equal to centre_rawclip then crop clip to 08:00/(4/zoom_factor) sec. [referred to as a highlight clip] with highlight frame at 2/(4/zoom_factor) seconds of duration. Divide remaining portions of clip into "new" clips; apply the same cutting/time re-mapping sequence 8-sec/(4/zoom_factor) clips with a 4-sec/(4/zoom_factor) gap between each.

A number of different modalities are available in regard to (i) selection of a set of media items as input to the edit-view arrangement, and (ii) maintaining a record of initial, intermediate or final results of the editing. One mode of operation in regard to maintenance of records preserves only the currently selected set of media items. Alternately, a current selection of media items may be preserved for later use with other editing operations, by using a "freeze" control (not shown). In yet another example, activation of the freeze button in regard to a selection of media items moves the current selection of media items into a visible list, replacing the selection previously held in the visible list. The visible list allows the user to append additional media items thereto in an arbitrary manner, for example by dragging and dropping desired media items 604 from the zoom browsing window 606. Other methods of selecting media items for addition to the visible list can also be used.

The relationship between the visible list and the subset of selected media items can take one of several forms. In a first form shown in FIG. 11A, all highlighted media items in the video zoom window 606 are shown in the visible list in a 1:1 fashion. A selection 806 of media items is made from the set of media items 802, and within the selected subset 806, two media items 804 and 808 have been highlighted, as depicted by a cross-hash pattern. Each of the media items in the selection 806 has an associated numeral on the left-hand side thereof, and accordingly the highlighted media items 804 and 808 are identified as media items 1 and 4 respectively. A visible list 810 contains the index numbers 1 and 4 (these indices having reference numerals 812 and 814 respectively), and the visible list 810 thus has a 1:1 correspondence to the visible media items in the selection 806. In this arrangement, the selection 806 incorporates all media items which have been highlighted, and all the highlighted media items are reflected in the visible list 810.

Figure 11A:
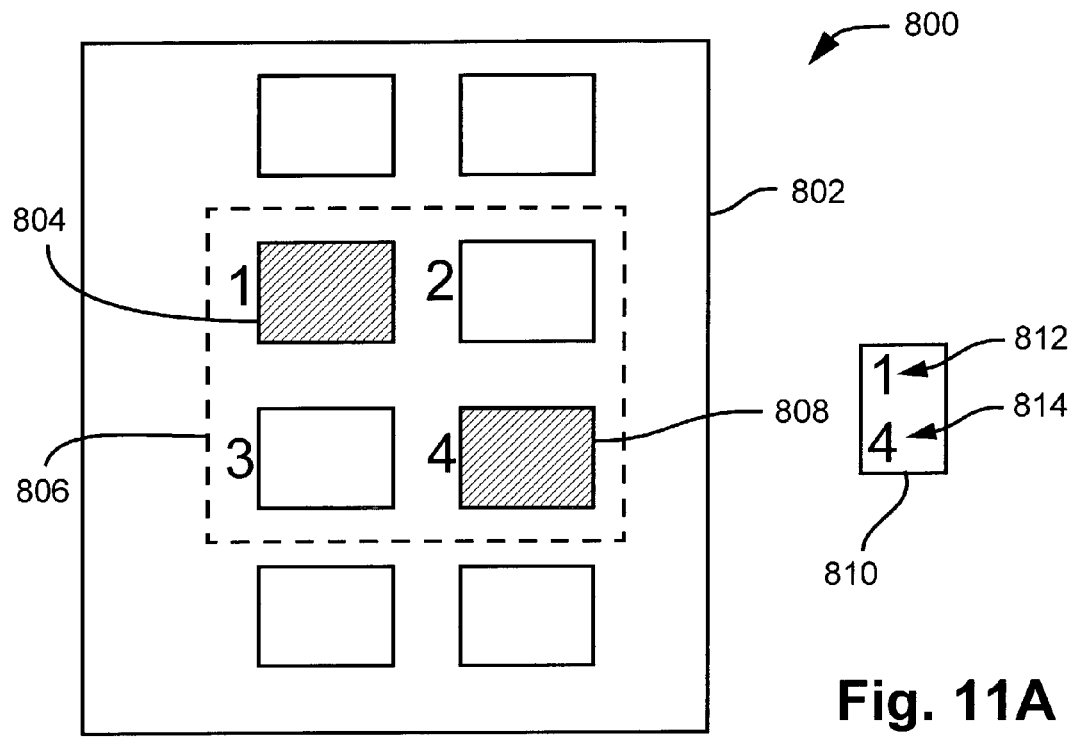
FIGS. 11A and 11B depict relationships between selected media items and a visible list.
Figure 11B:
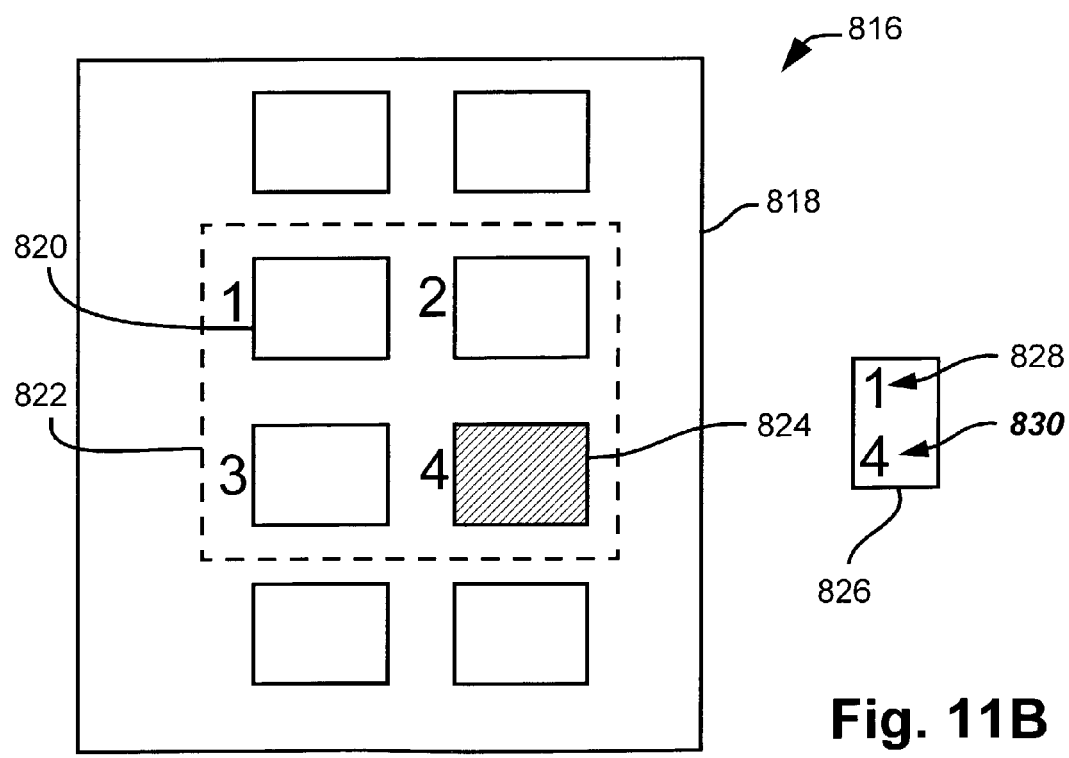

In an alternate arrangement shown in FIG. 11B, media items are individually highlighted, and appended to the visible list. Thus, a selection 822 of media items has been chosen from the available set of media items 818, and only one of the selected media items 824 has been highlighted, this being shown by the associated cross-hash pattern. The visible list 826 makes reference to media items having respective indices 1 and 4 (these indices having reference numerals 828 and 830 respectively), however in this arrangement the media item 820, having an index "1", was previously highlighted, but is no longer highlighted. This mode is called the "appending" mode, whereas the arrangement shown in FIG. 11A is a "direct representation" mode.

A number of different thumbnail selection methods can be adopted for highlighting individual media items in the above arrangements. In one example, thumbnail selection may "toggle", and accordingly a first click of the mouse pointer 620 on a media item in the browse window 606 will highlight the selected media item, and a second click will remove the highlighting. Alternatively, individual media item thumbnails in the browse window 606 can be dragged and dropped into the window 616 which in such a case, represents the visible list. Alternatively, a conventional MS Windows™ key combination can be used to select and deselect desired clips.

In one example of the edit-view mode, the set of display rules 108 typically used for browsing and navigating is replaced, or augmented, by an auto-edit template. The user then selects video clips from the zoom browsing window 606, this selection being performed on individual clips thereby defining both the quantity and order of the clips. The video zoom window 610 automatically updates as the user performs the selection, and displays the selected clips in the video display 608. As the user either selects, or de-selects individual video clips in the zoom browsing window 606, the auto-edit template which has been selected for incorporation into the set of display rules 108 automatically displays an auto-edited version of the composite video presentation in the video zoom window 610. In addition to selecting and/or de-selecting individual video clips in the zoom browsing window 606, the user can also alternate between different auto-edit templates, to thereby immediately view alternate productions based on the same selection of input media items. From a functional perspective, navigating between the various auto-edit templates can be implemented by means of a drop-down menu on the GUI 600 (not shown).

Although the above description has dealt primarily with video clips, the same concepts can be applied to still images, and/or collections of still images and video, in order to produce, for example, a hybrid, cyclic slide show.

A full-screen playback option can be provided, along with pause/play type controls using the keyboard 502. It is noted, that in all, or most cases described above, the zoom-browsing feature used in the zoom browsing window 606 can be replaced with other types of browsers such as scrolling browsers, with similar, albeit fewer advantages.

Although the edit-view functionality has been described using the GUI arrangement 600 which has both spatial and temporal sensory modalities, it is not restricted to use of this particular GUI. Accordingly, the edit-view functionality, namely provision of an automatic, substantially immediate, and continuous view of results of an edit, while the edit is actually being composed, can be practiced on other browsers which can be used to perform selection of the media items which are to be edited.

The methods of editing a set of media items 102 can be practiced using the general purpose computer system 500, or the DDC 1000, and the descriptions provided in relation to FIGS. 3 and 4 in regard to the browsing and navigating functionality of the GUI 600 can also be applied to the editing functionality. Alternately, the methods of editing a set of media items 102 can be practiced using dedicated hardware and software modules.

A specialised temporal summary can be derived from the edit-view production to thereby create a printed album of still-frames displaying the "essence" of the edit-view production. This "print summary technique" produces a "print summary production" by using, for example, a template, possibly being the same template used to produce the edit-view production or edit-preview production, operating in an alternative mode which can be selected by the user. Alternatively, a different, but related micro-template associated with the previously selected edit-view or edit-preview templates can be used for production of the print summary production. Alternatively, having regard to an Edit Decision List (EDL), which is a file storing time line data, effects, and references to video/audio contents, an edit-view can be derived from either the EDL descriptive level, or the fully rendered level (or a combination of both levels), this being followed by a summarisation process designed to provide the print summary. The summarisation process can be preceded by a print-optimised rendering process. This latter technique is not particularly efficient, but can be simpler to implement than a multiple-template approach.

Figure 12:
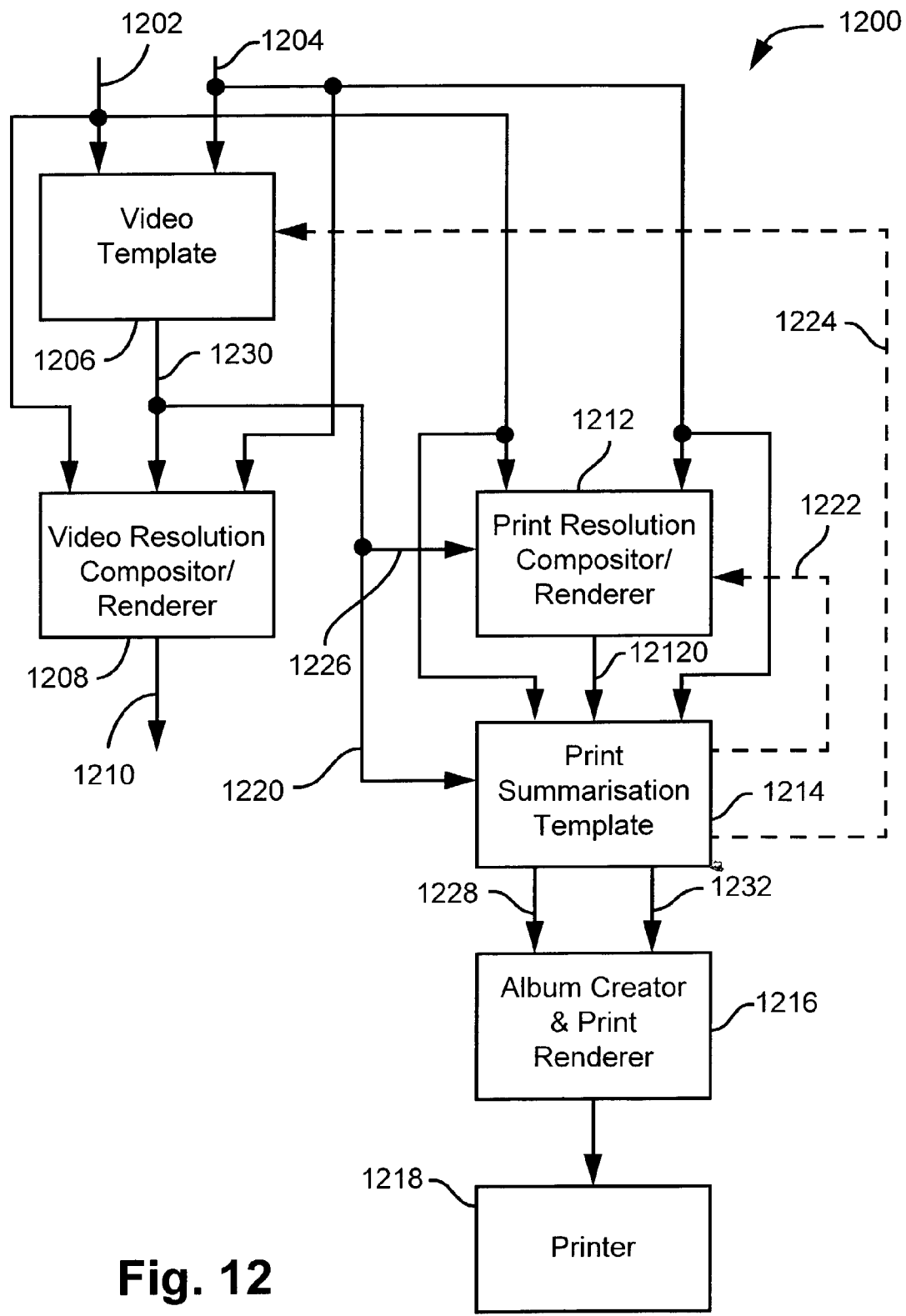
FIG. 12 shows the edit view process as used to create a print summary.

FIG. 12 shows the edit-view process incorporating the print summary process as used to create a print summary production. A video template module 1206 analyses and operates on input raw clips 1202 and metadata 1204 and outputs an EDL description 1230 of a video production, typically in enhanced EDL form, possibly including various media or effects components. The video production description 1230 is input to a video resolution compositor and renderer 1208 which creates a final stream of frames for viewing or saving to disk at 1210, this being the video production.

At the right of FIG. 12, a print resolution compositor and renderer module 1212 receives the same inputs as the video resolution compositor and renderer 1208, and performs substantially the same process as 1208 but at a higher pixel resolution to yield a print-resolution production having frames suitable for printing. A print summarisation template module 1214 receives (i) the print-resolution production 12120 in the form of one or more frames from 1212, (ii) the video production description 1230 as depicted by an arrow 1220, (iii) input metadata 1204 and possibly also (iv) the input raw clips 1202. The print summarisation template 1214 includes at least a simplistic frame sampling technique which is performed on the print resolution production 12120 from 1212. However, such a simple technique often yields unsatisfactory results because the print resolution production 12120 from 1212 is, like the video resolution production 1210, a "single entity" including transitions, effects, and temporal editing of the input raw clips 1202.

An improved sequence of still-frames for printing can be obtained by using an improved sampling technique in the print summarisation module 1214. In this case, a summarisation technique performs an analysis of the video production description 1230, to thereby produce an advanced metadata description of the production which is output by 1212 or 1208. An improved result can be obtained from 1214 by recognising the temporal structure data within the production description 1230 and, for instance, sampling one frame within each temporal portion of the print resolution production 12120 from 1212. Such a sampling technique will yield still-frames including a sample of the video title, and approximately one still-frame per chronological event described in the video or print production. This method can be further improved by conducting a more detailed analysis of the metadata within the video production description 1230 and also the input metadata 1204, either or both of which can yield information about events in the form, for example, of user-set highlight flags, object or feature-tracking trajectories and event bounds, and other labelled or described entities or portions of the production or its input raw clips 1202.

The output of the print summarisation template 1214 is an ordered selection of print frames 1228 and a selection of layout and framing graphics or preferences or similar parameters 1232. The latter output data 1232 (graphics & preferences) is typically of a similar or identical style or theme to that embodied or used within the video template 1206 to select effects or animations or other properties of the video production 1230. This parity or similarity of style and theme between the video production 1210 and print output 1228 is deliberate, and is intended to provide a strong visual connectivity and emotional relationship between the printed album (output on a printer 1218) and the video production 1210. The layout and framing graphics output 1232 can be obtained or selected in a number of ways. In a first arrangement, the video production description 1230 is fed, as depicted by an arrow segment 1220, directly to the print summarisation template 1214 that consequently produces the framing graphics output 1232. In a second arrangement, the video production description 1230 is fed, as depicted by an arrow segment 1226, firstly to the print resolution compositor/renderer 1212. The renderer 1212 consequently produces an output 12120 which is fed to the print summarisation template 1214 that consequently produces the framing graphics output 1232. The outputs from the print summarisation template feed to an album creator and print renderer module 1216 or a separate application (not shown), and thence are typically printed on a printer 1218.

In another example, referred to as Example "E", print summarisation of a video production can be performed according to the following list of process steps:

Identify the frames for printing: using prioritised metadata for each clip according to one of three options. Option 1 relates to feature-tracking metadata, where this is metadata indicating regions of the production in which feature tracking has been performed, such regions being of interest to the user. For this option, for each feature tracking interval detected in a clip, the middle or nearest-to-middle frame is selected as a printable frame. Option 2 relates to highlights. For this option, if highlights are present, then highlighted frames are identified as printable frames. In option 3, if no feature-tracking or highlights are present, then an arbitrary frame between in-and-out points for the clip is selected for printing. Only one of options 1-3 is used.

Render the video production to obtain the frame information: This involves rendering the movie, or producing an EDL, and then calling the frames identified for printing in the previous identification step to thereby obtain the EDL construction information for each frame. Subsequently, the desired frames need to be constructed using the movie rules, but at print resolution. As frames identified for printing are constructed during the render, they are added to the print list. The frames must be "constructed" in this manner in order to recover any rendering effects and so on that are incorporated into the frame for printing.

Print the frames identified in the previous steps: This involves notifying a print application to begin a new output by setting the required artwork for each page and frame according to the template theme. The template contains a description of rules and parameters used to build the movie from a set of source media.

There are several enhancements that can be added to the arrangement shown in FIG. 12. For instance, the print summarisation template 1214 can be generic, despite the video template 1206 (with its corresponding style or theme) having been selected by the user on the basis of the video template style. Alternately, the print summarisation template 1214 can be provided, wholly or partially, as part of a set of templates with a common style, or theme, this set of templates including the video template 1206, and possibly other summarisation templates such as the previously described edit-preview template. This set of templates has previously been referred to, in a particular instance, as a video template plus one or more micro-templates (the latter term being applicable to edit-preview and print summarisation templates). Another enhancement is to combine the print summarisation template 1214 and the video template 1206 to thereby form a common, or enhanced video template, which can also include additional means to control or select the output resolution of the subsequent compositor and renderer module(s) (1208 and 1212 respectively).

Further improvements are possible in regard to the efficiency of the print summarisation process as shown in FIG. 12. Such improvements include selective compositing and rendering of print resolution frames by the feedback control represented by a dashed line 1222. Thus, the print summarisation template 1214 can control the compositor and renderer module 1212 to reduce processing burden and memory or disk storage when generating the print resolution output 1228. The control (or "gating") by the module 1214 can be generated directly by the selection of still-frames that the template 1214 derives from its combination of internal rules and input metadata from 1220, 1204 and 1202. A further improvement is possible with the implementation of the feed back loop represented by a dotted line 1224, whereby the print summarisation template 1214 controls the behaviour of the video template 1206 to selectively reduce the extent of the video production 1210, and the output video production description 1230. This reduces the video template processing burden, and any subsequent processing burden within the print resolution compositor and renderer 1212. For instance, this feedback 1224 can selectively direct the video template 1206 to only output brief temporal descriptions (and any accompanying effects) based on prioritisation of certain metadata 1204 which is input to the print summarisation template 1214 and video template 1206. An example of such metadata 1204 that could be prioritised by the print summarisation template 1214 includes user-set highlight flags, or feature-tracked trajectories or event bound information.

The methods of print-summarising the production 1210 or the production description 1230 can be practiced using the general purpose computer system 500, or the DDC 1000. Alternately, the methods of print-summarising the production 1210 or the production description 1230 can be practiced using dedicated hardware and software modules.

The video-zoom, edit-view, edit-preview and print-summarisation features can all benefit from use of a "flow-mode" function. This function enables selection of one or more media representations, using either the spatial or temporal browsers, (606 and 610 respectively) and in addition performs the activation or re-initialisation of associated processing steps such as manual editing and preview, video template activation and preview, edit-view and so on. According to one arrangement, the noted activation or re-initialisation of associated processing steps is implemented by chaining the processing steps together so that activation of a first step in the chain, for example, automatically activates the remainder of the process steps in the chain. The path that the chained processes follow can vary depending both on the system settings, and on the particular operations that the user effects. Thus, in one example, the system settings can establish a manual editing mode using flow mode, in which case the user can select successive clips in the browser window 606 (see FIG. 1). In another example, the system settings can establish an auto-editing mode using flow mode, in which case the user can either select successive clips in the browser window 606 (see FIG. 1) or alternately can select successive auto-editing templates. The various paths that the chained processes can take are described, for example, by the steps 1642, 1644 and 1646 in FIG. 16B. This flow mode functionality improves system and user interaction performance or workflow, by reducing the number of input operations required of the user in order to perform repetitive, iterative or incremental tasks. An exemplary such task is previewing the results of an edit process applied to the current selected media items, and repetitively revising such media items with the intent of immediately monitoring the next result of the edit process.

The Flow Mode function is activated by means of a setup switch that alternates button behaviour of the media thumbnails in the spatial browser window 606. The flow mode function is part of the GUI system that enables the user to control the automation of play-list, "video-zoom", or "edit-view", creation. Toggling of a Flow-Mode switch is the only action the user must take to enable or disable automatic user-selection tracking behaviour in video-zoom browsing, play-list or edit-view creation or similar functions.

The following example, referred to as Example "F" describes a play-list creation process using manual editing, both with and without flow-mode activation.

Activation of the Flow Mode process changes the behaviour of graphical icons such as 604 in the spatial browser window 606. Enabling the Flow-Mode switch (not shown) is the only set-up action required to enable or disable automatic play-list or edit-view creation in manual editing mode.

When flow-mode is de-selected, play-list creation, in one arrangement, involves steps described by the following pseudo-code fragment:
1. Select a clip
2. Drag the clip to the time-line
3. Position in sequence then release.

When flow-mode is selected, play-list creation using manual editing, in one arrangement, involves steps described by the following pseudo-code fragment:

| | |
|---|---|
| 1. Shift/One mouse down: | Selection add the media to the play-controller and commences play the media attributes are listed in the info panel Each subsequent selection inherently becomes functional button—adds to end of play-list + takes playback position + scrubber back to start of play-list the no. of media items selected are specified in the info panel Selection order is maintained |

Figure 16A:
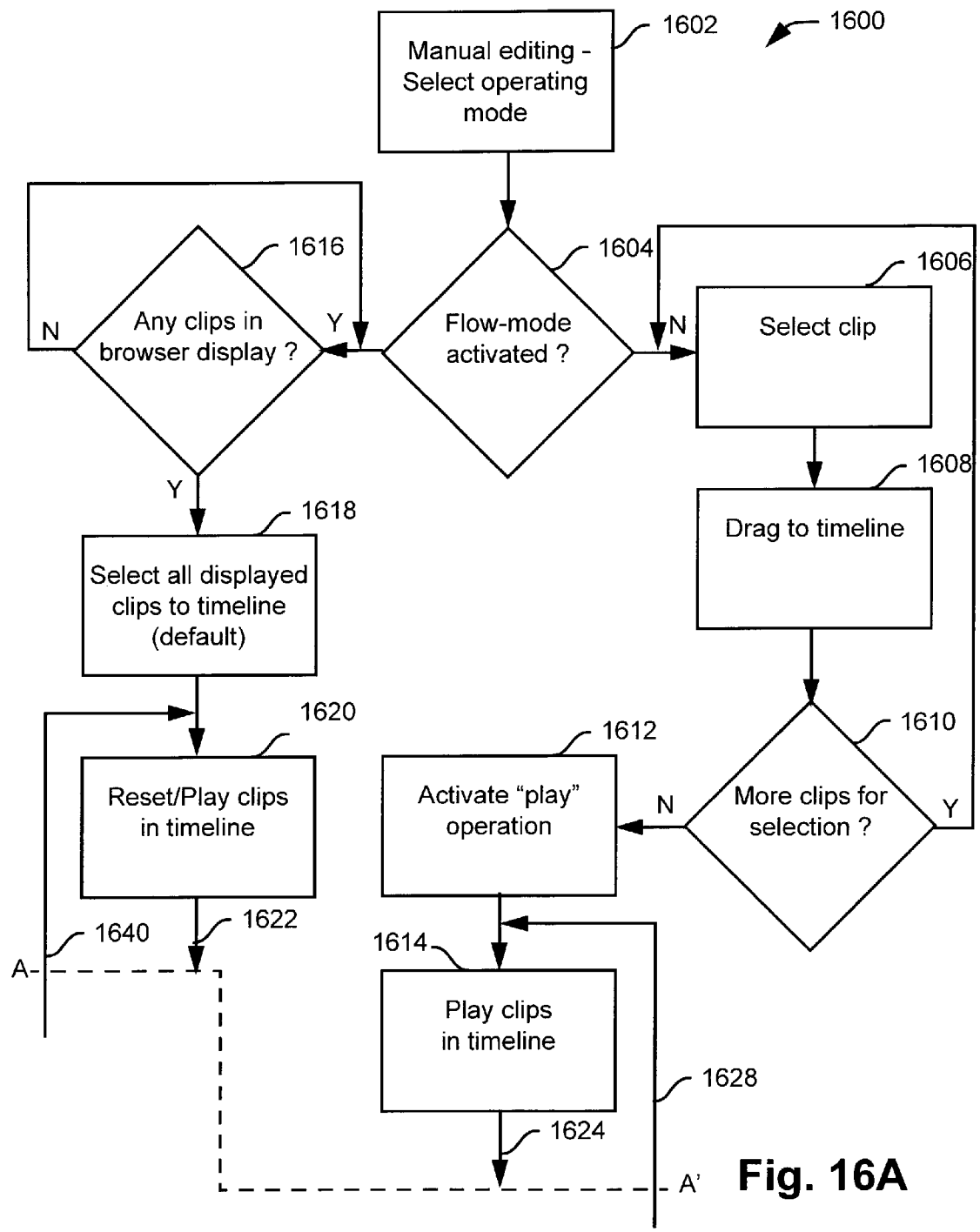
FIGS. 16A-16B is a process flow chart for manual editing a video production, both with and without flow mode being activated.
Figure 16B:
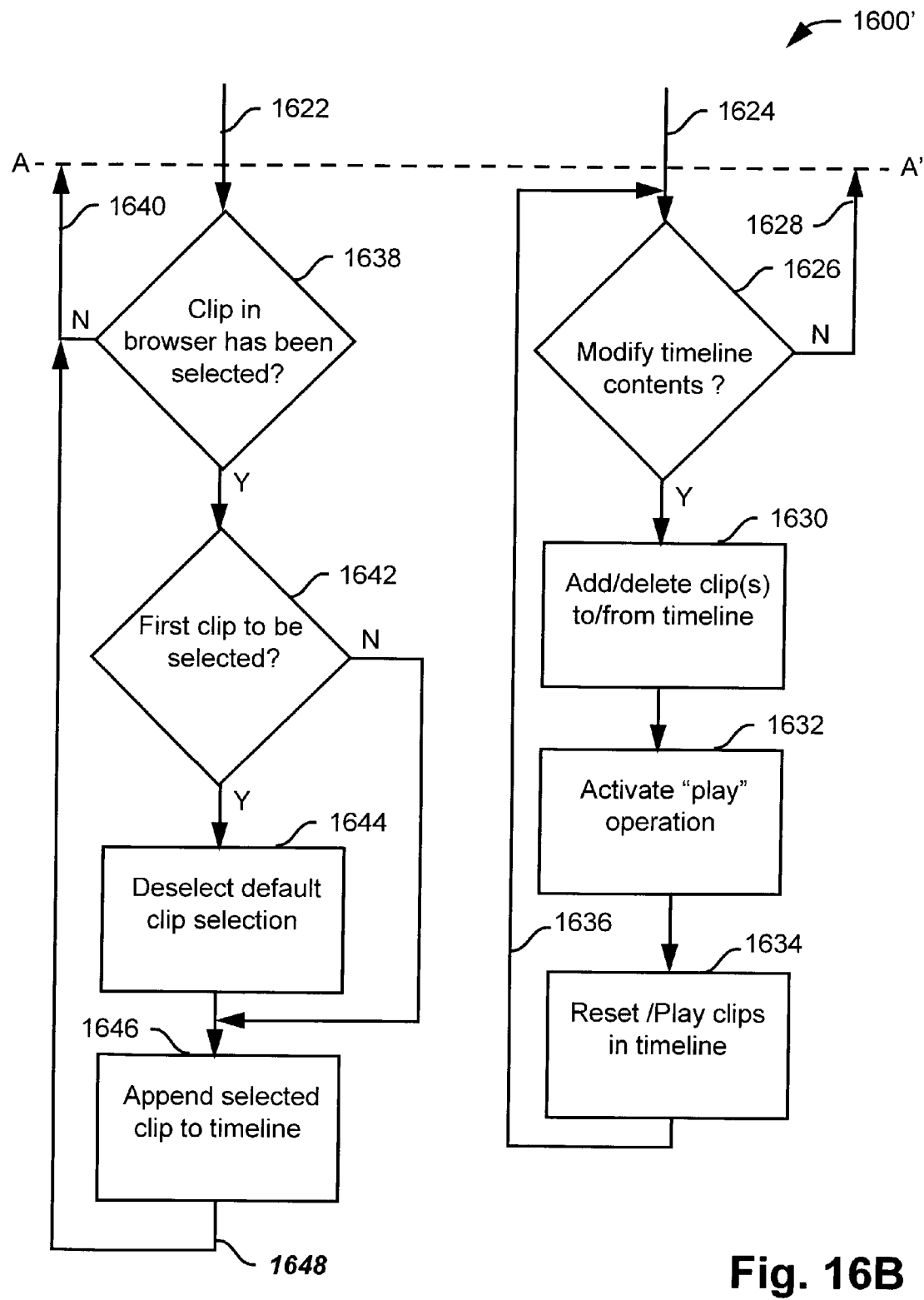

FIGS. 16A and 16B constitute a process flow chart for manual editing of a video production, wherein flow mode can optionally be activated. Starting in FIG. 16A, a process strand 1600 commences with a step 1602 wherein an operating mode is selected. A following testing step 1604 determines whether flow mode has been selected. If not, the process strand 1600 is directed according to an "N" arrow to a step 1606. The step 1606 selects a clip, after which a step 1608 drags the selected clip to the timeline. A subsequent testing step 1610 determines whether further clips are to be selected, and if so, the process strand 1600 is directed back to the step 1606 by a "Y" arrow. If no further clips are to be selected, the process strand 1600 is directed from the step 1610 by a "N" arrow to a step 1612 in which the "Play" operation must be selected, after which a step 1614 plays the clips in the time-line. The process strand 1600 is directed from the step 1614, via an arrow 1624, to a step 1626 which belongs to a process strand 1600' in FIG. 16B.

Returning to the decision step 1604, if flow mode is selected, then the process 1600 is directed by a "Y" arrow to a step 1616 which tests whether there are any video clips displayed in the browser window 606. If no clips are displayed, then the process 1600 loops back to the step 1616 as depicted by a "N" arrow. If clips are displayed in the browser display, then a following step 1618 selects all the displayed clips as a default selection to the timeline. A following step 1620 automatically resets the timeline, and plays the clips in the timeline. The process strand 1600 is directed from the step 1620, via an arrow 1622, to a step 1638 which belongs to the process strand 1600' in FIG. 16B.

Turning to FIG. 16B, the step 1626 determines whether the timeline contents are to be modified. If not, the process strand 1600' is directed by an "N" arrow 1628 back to the step 1614 in FIG. 16A. From a practical perspective, the step 1614 continues to play the clips in the timeline until all clips have been played. If the step 1626 in FIG. 16B determines that the timeline contents are to be modified, then the process strand 1600' is directed by a "Y" arrow to a step 1630. This step adds and/or deletes clips to the timeline, after which in a step 1632, the play operation must be activated. A subsequent step 1634 resets the play operation, if the step 1614 in FIG. 16A has not yet completed playing all clips in the timeline, after which the step 1634 plays the clips in the modified timeline. The process strand 1600' is then directed by an arrow 1636 back to the step 1626.

Returning to the step 1638 in FIG. 16B, this step determines whether any clips in the browser have been selected. If not, the process strand 1600' is directed by a "N" arrow 1640 back to the step 1620 in FIG. 16A. From a practical perspective, the step 1620 continues to play the clips in the timeline until all clips have been played. If the step 1638 determines that a clip in the browser has been selected, then the process strand 1600' is directed by a "Y" arrow to a step 1642 which determines whether the clip detected in the step 1638 is the first clip to be selected in the browser. If this is the case, then the process strand 1600' is directed by a "Y" arrow to a step 1644 which deselects the default selection made in the step 1618 in FIG. 16A. A subsequent step 1646 appends the selected clip, which has been detected in the step 1638, to the timeline. The process strand 1600' is then directed, by an arrow 1648 and the arrow 1640 back to the step 1620 in FIG. 16A. Returning to the step 1642, if the selected clip detected in the step 1638 is not the first clip to be selected, then the process strand 1600' is directed by an "N" arrow from the step 1642 to the step 1646. From a practical perspective, each additional clip detected by the step 1638 causes the clip to be appended to the timeline by the step 1646, after which the step 1620 in FIG. 16A automatically resets the timeline to its starting point and plays the contents of the timeline.

Clearly, flow-mode reduces the number of operations required from the user when performing manual editing of a video production.

The following example, referred to as Example "G" describes a play-list creation process using auto-editing with a template, both with and without flow-mode activation.

As described in relation to the manual editing example "F", activation of the Flow Mode process changes the behaviour of graphical icons such as 604 in the spatial browser window 606. Toggling the Flow-Mode switch (not shown) is the only set-up action required to enable or disable automatic play-list or edit-view creation in auto-editing mode.

When flow-mode is selected, play-list creation using auto-editing, in one arrangement, involves steps described by the following pseudo-code fragment:

Active Template Example

| | |
|---|---|
| 1. Shift/One mouse down: | Selection add the media to the play-controller input play-list<br>In Flow Mode + active template mode the unedited input play-list may be displayed before editing occurs during the template processing, on completion the template (output) play-list is then displayed in place. |

-continued

| | |
|---|---|
| | Selected browser items remain in the input play-list until de-selected in the browser (even if the item is not present in the output playlist)—thus removing that item from the input play-list |

Figure 17A:
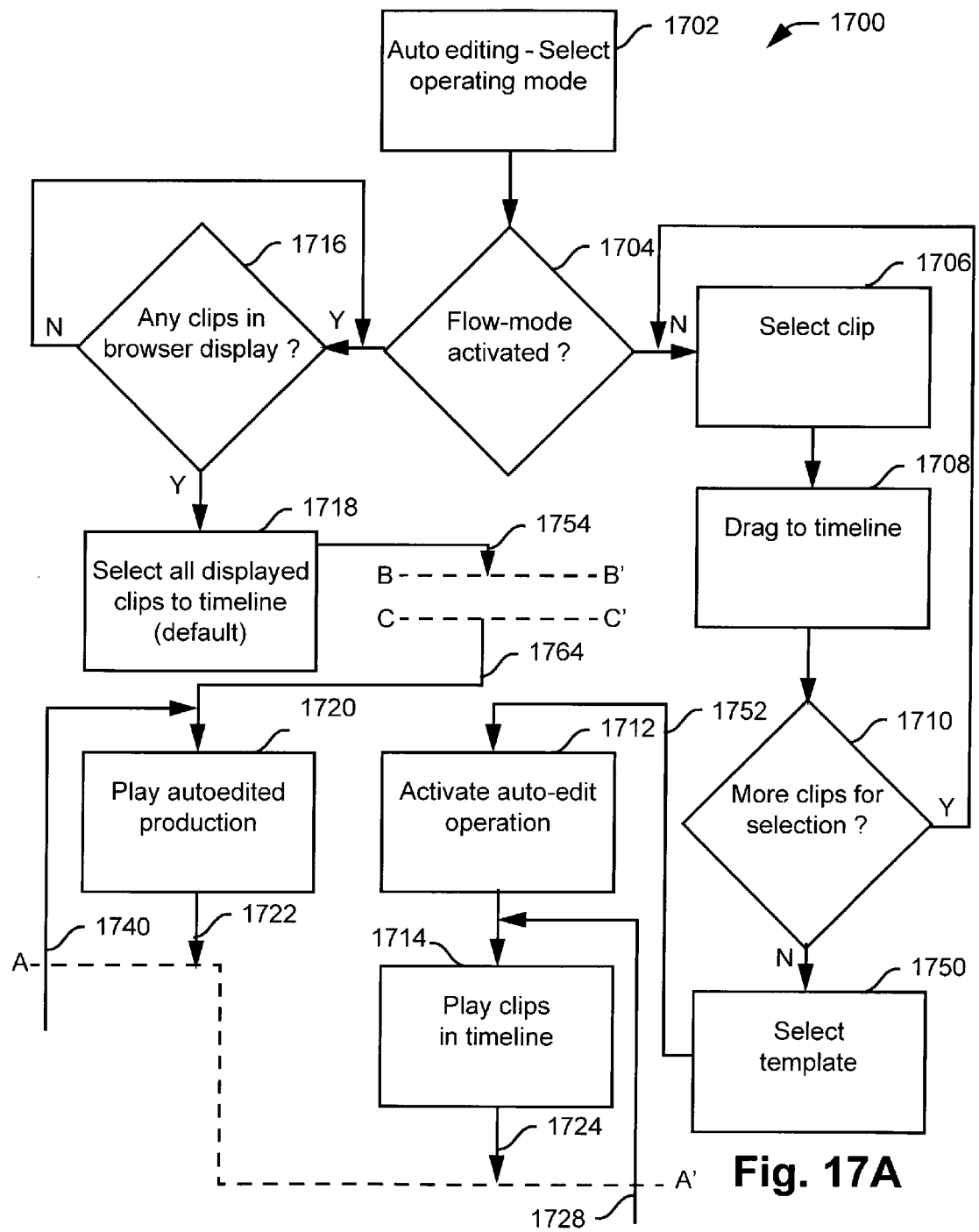
FIGS. 17A-17C is a process flow chart for auto-editing a video production, both with and without flow mode being activated.
Figure 17B:
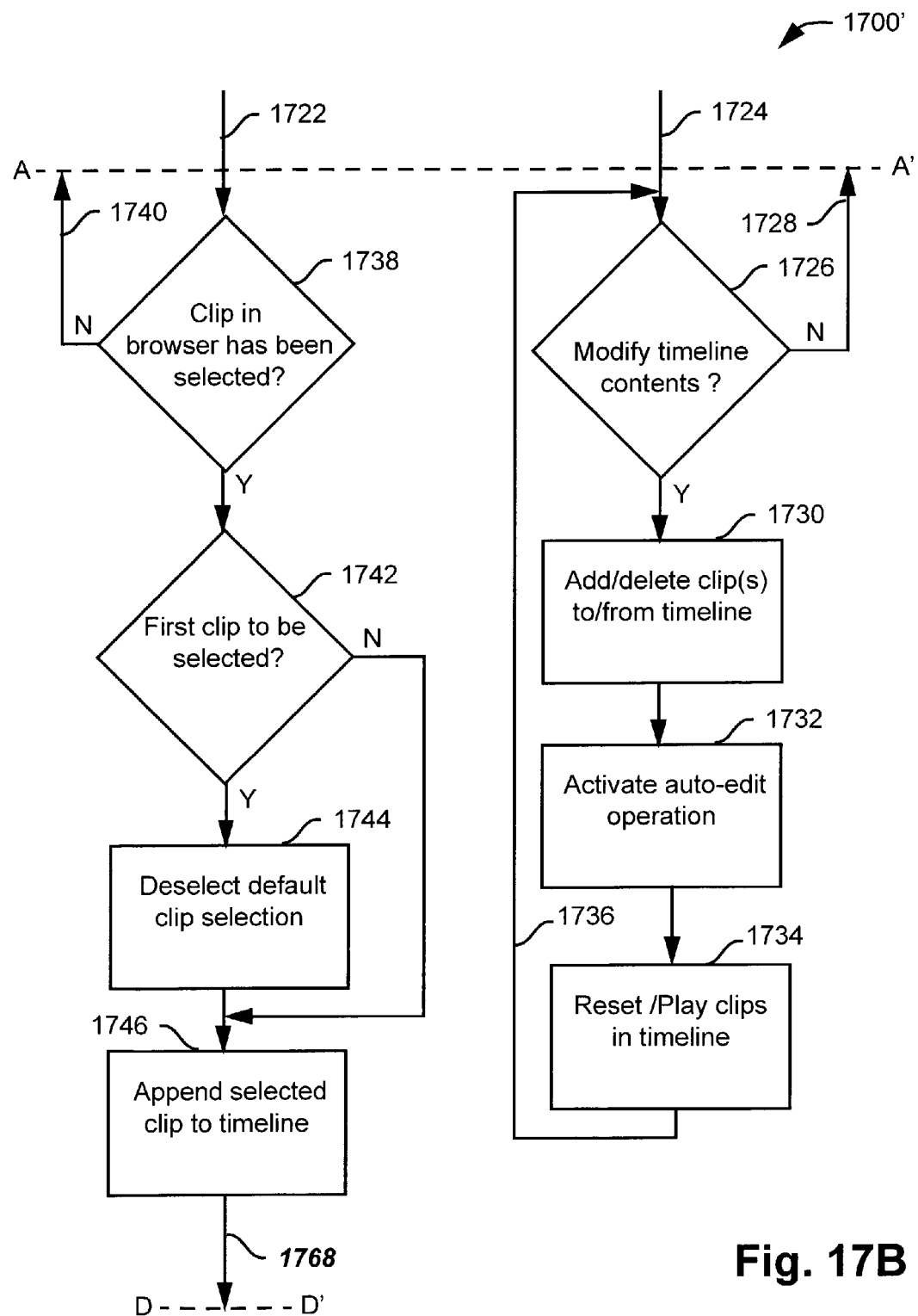
Figure 17C:
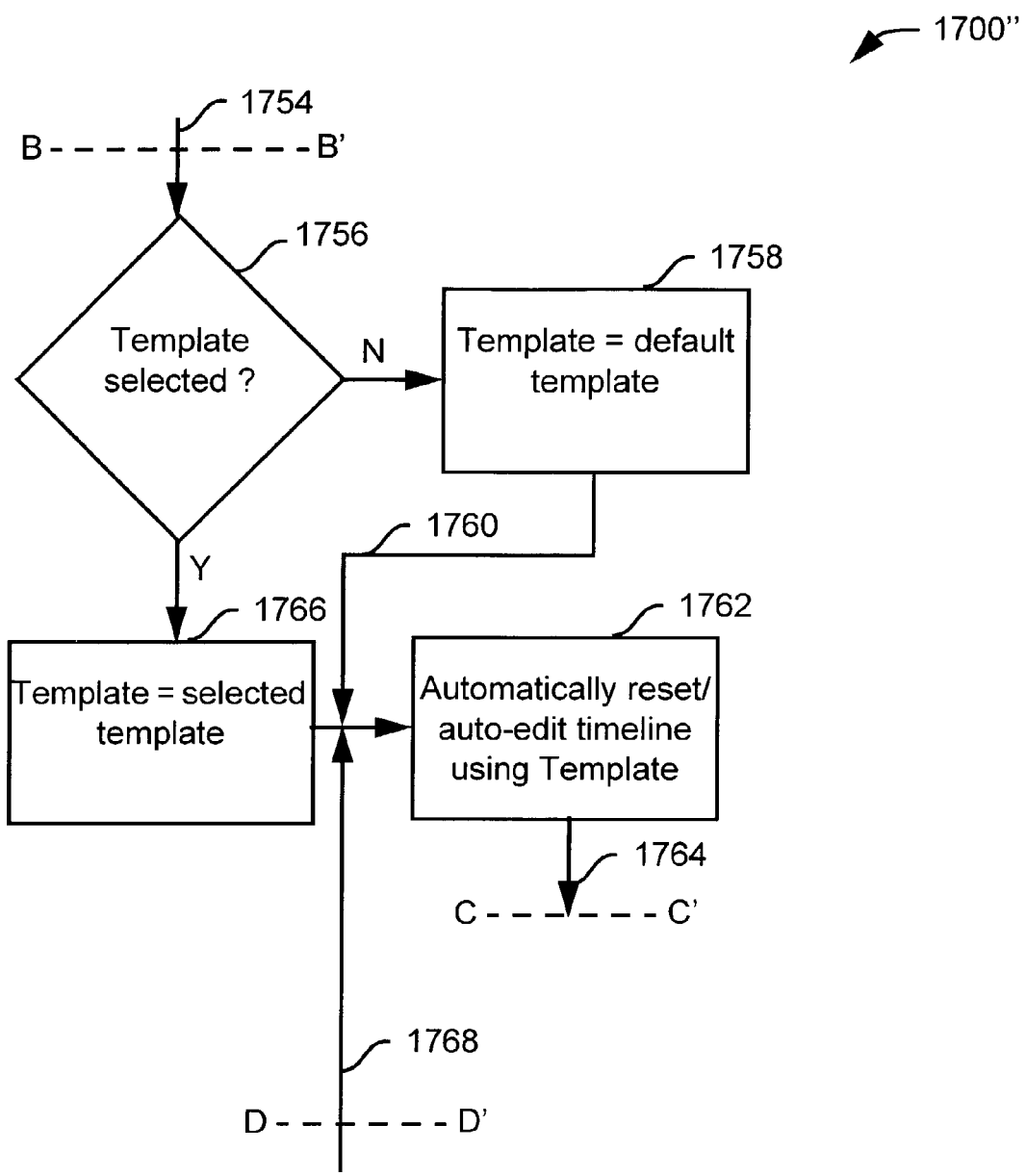

FIGS. 17A, 17B and 17C constitute a process flow chart for auto editing of a video production, wherein flow mode can optionally be activated. Starting in FIG. 17A, a process strand 1700 commences with a step 1702 wherein an operating mode is selected. A following testing step 1704 determines whether flow mode has been selected. If not, the process strand 1700 is directed according to an "N" arrow to a step 1706. The step 1706 selects a clip, after which a step 1708 drags the selected clip to the timeline. A subsequent testing step 1710 determines whether further clips are to be selected, and if so, the process strand 1700 is directed back to the step 1606 by a "Y" arrow. If no further clips are to be selected, the process strand 1700 is directed from the step 1710 by a "N" arrow to a step 1750 which selects a template for auto-editing. Thereafter, the process strand 1700 is directed by an arrow 1752 to a step 1712 in which the "Play" operation must be selected, after which a step 1714 plays the clips in the timeline. The process strand 1700 is directed from the step 1714, via an arrow 1724, to a step 1726 which belongs to a process strand 1700' in FIG. 17B.

Returning to the decision step 1704, if flow mode is selected, then the process 1700 is directed by a "Y" arrow to a step 1716 which tests whether there are any video clips displayed in the browser window 606. If no clips are displayed, then the process 1700 loops back to the step 1716 as depicted by a "N" arrow. If clips are displayed in the browser display, then a following step 1718 selects all the displayed clips as a default selection to the timeline. The process strand 1700 is directed by an arrow 1754 to a step 1756 in a process strand 1700" in FIG. 17C.

Turning to FIG. 17C, the step 1756 determines whether a template has been selected. If this is not the case, then the process strand 1700" is directed by a "N" arrow to a step 1758 which sets the "Template" (ie the template which is to be utilised for auto-editing) to be a default template which has been pre-defined. Thereafter, a step 1762 automatically resets the auto-editing process, and automatically applies the "Template" to the contents of the timeline. The process strand 1700" is then directed by an arrow 1764 to a step 1720 in the FIG. 17A. Returning to the step 1756, if a template has been selected, then the process strand 1700" is directed by a "Y" arrow to a step 1766 which sets the "Template" to the template which has been selected. The process strand 1700" is then directed to the step 1762.

Returning to FIG. 17A, the step 1620 plays the autoedited production produced in the step 1762 in FIG. 17C. The process strand 1700 is directed from the step 1720, via an arrow 1722, to a step 1738 which belongs to a process strand 1700' in FIG. 17B.

Turning to FIG. 17B, the step 1726 determines whether the timeline contents are to be modified. If not, the process strand 1700' is directed by an "N" arrow 1728 back to the step 1714 in FIG. 17A. From a practical perspective, the step 1714 continues to play the clips in the timeline until all clips have been played. If the step 1726 in FIG. 17B determines that the timeline contents are to be modified, then the process strand 1700' is directed by a "Y" arrow to a step 1730. This step adds and/or deletes clips to the timeline, after which in a step 1732, the auto-edit operation must be activated. A subsequent step 1734 resets the play operation, if the step 1714 in FIG. 17A has not yet completed playing all clips in the auto-edited timeline, after which the step 1734 plays the auto-edited production. The process strand 1700' is then directed by an arrow 1736 back to the step 1726.

Returning to the step 1738 in FIG. 17B, this step determines whether any clips in the browser have been selected. If not, the process strand 1700' is directed by a "N" arrow 1740 back to the step 1720 in FIG. 17A. From a practical perspective, the step 1720 continues to play the clips in the timeline until all clips have been played. If the step 1738 determines that a clip in the browser has been selected, then the process strand 1700' is directed by a "Y" arrow to a step 1742 which determines whether the clip detected in the step 1738 is the first clip to be selected in the browser. If this is the case, then the process strand 1700' is directed by a "Y" arrow to a step 1744 which deselects the default selection made in the step 1718 in FIG. 17A. A subsequent step 1746 appends the selected clip, which has been detected in the step 1738, to the timeline. The process strand 1700' is then directed, by an arrow 1768 back to the step 1762 in FIG. 17C. Returning to the step 1742, if the selected clip detected in the step 1738 is not the first clip to be selected, then the process strand 1700' is directed by an "N" arrow from the step 1742 to the step 1746. From a practical perspective, each additional clip detected by the step 1638 causes the clip to be appended to the timeline by the step 1746, after which the step 1762 in FIG. 17C automatically applies the Template to the modified timeline.

It is possible to implement systems for play-list creation so that the systems operate only in flow-mode. In such cases the process decision steps 1604 and 1704 in FIGS. 16A and 17A respectively are "hard wired" to the "Y" condition, and the process branches associated with the "N" option can be omitted.

The described arrangements for video-zoom, edit-view and edit-preview functions can use flow-mode functionality to provide improved performance, reduced user workflow problems, and substantially immediate or simultaneous results. The flow-mode function assists in these goals by providing an inherent process activation or re-activation feature associated with the conventional thumbnail selection activation. The flow-mode function typically requires only one mouse-click or keyclick operation, from the user, for the selection operation. Thus, the selection mouse-click or key-click operation becomes a more complex function embodying at least a thumbnail (or other media) selection operation and a re-initialisation and activation of at least one subsequent process such as a play-list module and renderer/viewer, or a video template module and renderer/viewer. Further operations can include an analysis of the current selection list and selection mode, and replacing or appending a recently user-selected media item and current selection list depending on the results of the analysis.

Figure 13:
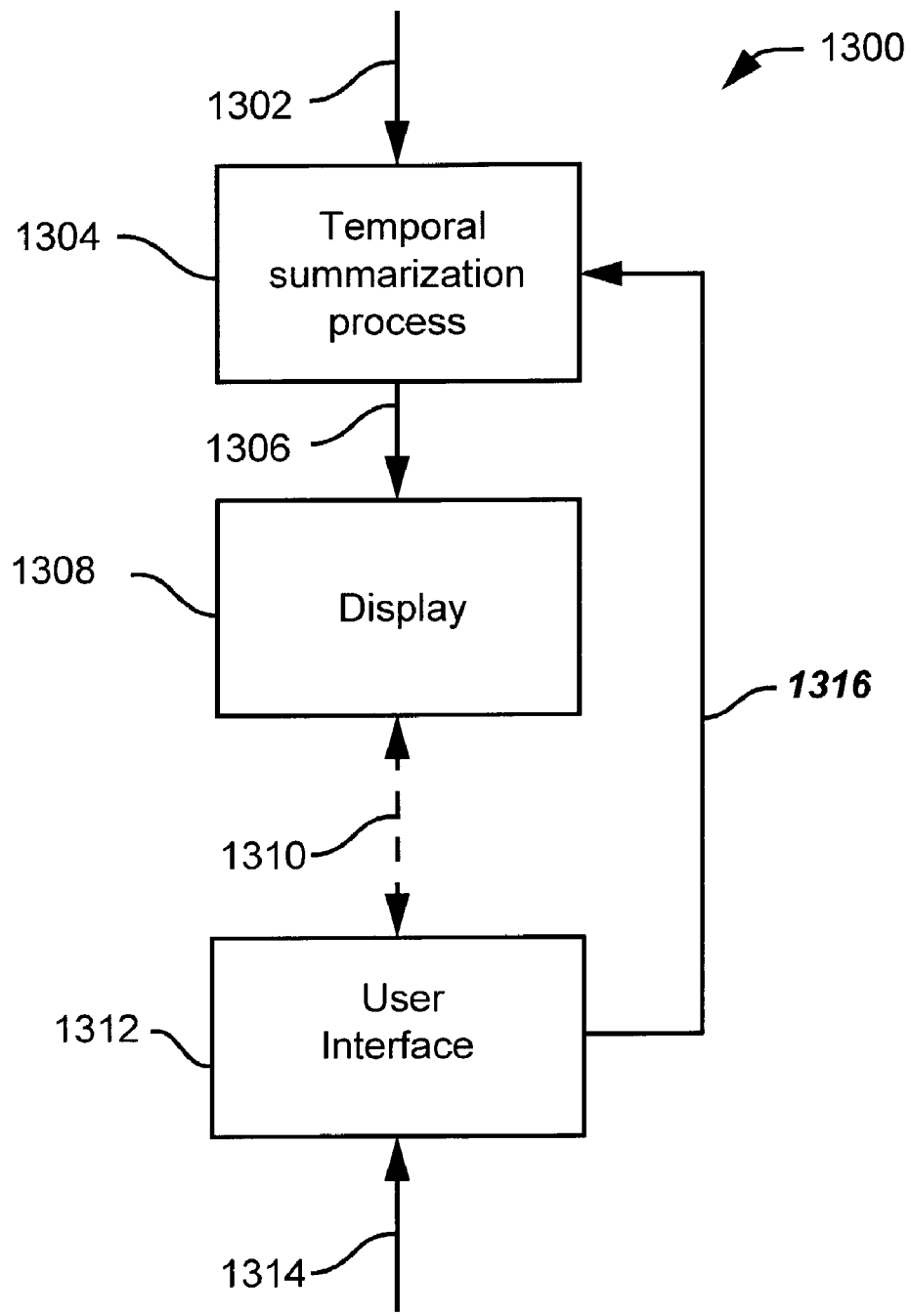
FIG. 13 shows a process for previewing a production, by navigating temporally through the production.

FIG. 13 shows a process 1300 for navigating through a video production. The production is provided, as depicted by an arrow 1302, to a temporal summarisation process 1304 which acts upon the production to form a temporal summary of the production at 1306. The temporal summary provided at 1306 is then conveniently displayed on a display 1308, which can be the video display 514, or alternately the LCD display 1014 in FIGS. 3 and 4 respectively. The production provided at 1302 may have been stored on the MOD 1010 in the DDC 1000 in FIG. 4, or alternatively, may have been stored on the hard drive 510 in the PC 500 shown in FIG. 3. The user is able to provide a navigation input at 1314 to a user interface 1312, the user interface 1312 preferably being in register with the display 1308 as depicted by a dashed arrow 1310. The registration between the user interface 1312 and the display 1308 is provided by user interfaces such as the touch screen 1002 and pen 1023 shown in FIG. 4 since the touch screen 1002 is typically overlayed over the LCD display 1014, enabling the user to direct the navigation input 1314 to a temporal region of interest within the production as summarised and shown on the display 1308. The navigation input at 1314 is processed by the processor 505 or the processor 105 in FIG. 3 or 4 respectively, and consequently a modifying feedback is provided, as depicted by an arrow 1316, back to the temporal summarisation process 1304. This feedback 1316 emphasises the temporal region of interest indicated by the navigation input at 1314, this emphasis being reflected in the temporal summary which is output at 1306 and displayed at 1308.

Figure 14:
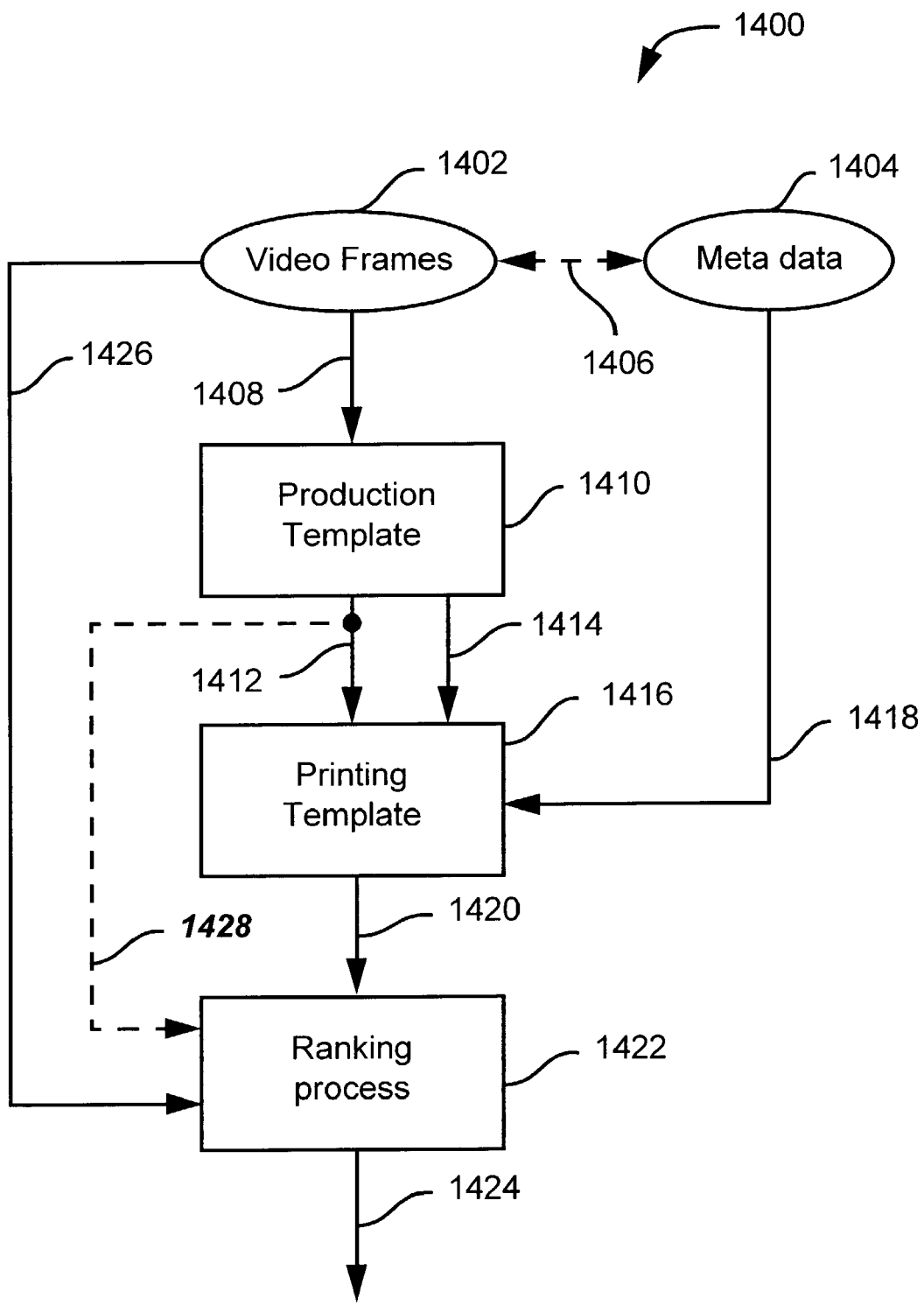
FIG. 14 shows a process for producing a frame for printing from a collection of video frames.

FIG. 14 shows a process 1400 for producing a frame for printing from a plurality of video frames 1402, which may have associated metadata 1404. The optional availability of the metadata is depicted by a dashed arrow 1406. A production template 1410 is applied, as depicted by an arrow 1408 to the video frames 1402, and produces a set of "effected" video frames at 1412. These frames have either been edited, and/or have had effects applied to them. The production template 1410 also produces at 1414 a description of the production template 1410 itself, and/or a description of the production which is produced at 1412. The description of the production is typically in the form of an EDL.

A printing template 1416 uses either or both the description of the production template and the EDL at 1414 as well as the effected video frames at 1412 to determine relative suitability measures at 1420. These suitability measures are typically per-frame measures for each of the effected frames at 1412, and indicate the relative suitability of effected frames for printing. It is noted that typically each effected frame has a corresponding source frame in the set of video frames 1402. The suitability measure at 1420 is determined based upon one or more of the metadata at 1418, and the description of the production template or the EDL at 1414. Suitability measures at 1420 are provided to a ranking process 1422 which uses the suitability measures to output a frame for printing at 1424. The frame output at 1424 is selected from the video frames 1402, as depicted by an arrow 1426, or from the effected video frames at 1412 as depicted by a dashed arrow 1428.

INDUSTRIAL APPLICABILITY

It is apparent from the above that the arrangements described are applicable to the data processing industries.

The foregoing describes only some embodiments of the present invention, and modifications and/or changes can be made thereto without departing from the scope and spirit of the invention, the embodiment(s) being illustrative and not restrictive.

The invention claimed is:

1. A method of processing a set of media items, said method comprising the steps of:
   (a) selecting a sub-set of said media items;
   (b) concurrently displaying (i) a spatial representation of the selected sub-set and (ii) a temporal representation of the selected sub-set;
   (c) selecting one of a temporal navigation mode and a spatial navigation mode;
   (d) providing a spatial navigation command, if the spatial navigation mode has been selected, to the spatial representation to thereby modify the selection of the sub-set of said media items, to thereby contemporaneously change the spatial representation and the corresponding temporal representation; and (e) providing a temporal navigation command, if the temporal navigation mode has been selected, to the temporal representation to thereby modify the selection of the sub-set of said media items, to thereby contemporaneously change the temporal representation and the corresponding spatial representation, wherein the selected sub-set includes at least one of wholly encompassed media items and partially encompassed media items from the set;

the displayed spatial representation of the selected sub-set can include, dependent on spatial selection rules, at least one of representations of said wholly encompassed media items, and spatial representations of said partially encompassed media items; and the displayed temporal representation of the selected sub-set can include, dependent on temporal selection rules, at least one of a temporal representation of said wholly encompassed media items, and a temporal representation of said partially encompassed media items, the method further comprising, in relation to said partially encompassed media items, the steps of:

determining whether a pixel area of the partially encompassed media items captured by the selecting step exceeds a pixel threshold; and if the pixel area exceeds the pixel threshold;

displaying, depending upon the pixel area captured by the selecting step, a part of the partially encompassed media items in the spatial representation of the selected sub-set; and displaying, depending upon the pixel area captured by the selecting step, time segments of the partially encompassed media items in the temporal representation of the selected sub-set.

2. A method according to claim 1, wherein:

the spatial representation of the selected sub-set is displayed by applying spatial extraction rules to the sub-set;

the temporal representation of the selected sub-set is displayed by applying video rules to the sub-set;

the modification, dependent upon the spatial navigation command, of the selection of the media items is dependent upon spatial selection rules; and the modification, dependent upon the temporal navigation command, of the selection of the media items is dependent upon temporal selection rules.

3. A method according to claim 2, wherein the spatial extraction rules, the video rules, the spatial selection rules and the temporal selection rules are incorporated into a template.

4. A method of processing according to claim 3, said method comprising further steps of:

editing the modified sub-set of media items by at least one of (i) modifying a media item in the modified sub-set, and (ii) incorporating a transition between two of the media items in the modified sub-set; and storing at least one of (i) information about a media item in the edited sub-set and (ii) the media item in the edited sub-set, to thereby form an edit-view production.

5. A method according to claim 4, wherein the editing step is performed by auto-editing rules that are included in the template, and the information about the media item in the edited sub-set is an EDL.

6. A method of processing according to claim 5, wherein said template reduces the spatial resolution of said edited media items, to thereby form an edit-preview production which is a summarization of the edit-view production.

7. A method of processing according to claim 5, wherein said template reduces the color resolution of said edited media items, to thereby form an edit-preview production which is a summarization of the edit-view production.

8. A method of processing according to claim 5, wherein said template reduces the temporal resolution of said edited media items, to thereby form an edit-preview production which is a summarization of the edit-view production.

9. A method of processing according to claim 5 further comprising, after the editing step, a further step of:

applying a summarization template to the edited modified sub-set of media items to thereby form an edit-preview production which is a summarization of the edit-view production.

10. A method according to claim 5, comprising further steps of:

compositing and rendering the edited modified sub-set of media items to thereby form a print resolution production; and frame sampling the print resolution production to thereby produce frames for printing.

11. A method according to claim 10, wherein the frame sampling is dependent upon at least one of the EDL and metadata associated with the modified sub-set of media items.

12. An apparatus for processing a set of media items, said apparatus comprising:

(a) selecting means for selecting a sub-set of said media items;

(b) displaying means for concurrently displaying (i) a spatial representation of the selected sub-set and (ii) a temporal representation of the selected sub-set;

(c) selecting means for selecting one of a temporal navigation mode and a spatial navigation mode;

(d) providing means for providing a spatial navigation command, if the spatial navigation mode has been selected, to the spatial representation to thereby modify the selection of the sub-set of said media items, to thereby contemporaneously change the spatial representation and the corresponding temporal representation; and (e) providing means for providing a temporal navigation command, if the temporal navigation mode has been selected, to the temporal representation to thereby modify the selection of the sub-set of said media items, to thereby contemporaneously change the temporal representation and the corresponding spatial representation, wherein the selected sub-set includes at least one of wholly encompassed media items and partially encompassed media items from the set;

the displayed spatial representation of the selected sub-set can include, dependent on spatial selection rules, at least one of representations of said wholly encompassed media items, and spatial representations of said partially encompassed media items; and the displayed temporal representation of the selected sub-set can include, dependent on temporal selection rules, at least one of a temporal representation of said wholly encompassed media items, and a temporal representation of said partially encompassed media items, the apparatus further comprising, in relation to said partially encompassed media items:

determining means for determining whether a pixel area of the partially encompassed media items captured by the selecting step exceeds a pixel threshold; and displaying means for, if the pixel area exceeds the pixel threshold;

displaying, depending upon the pixel area captured by the selecting step, a part of the partially encompassed media items in the spatial representation of the selected sub-set; and displaying, depending upon the pixel area captured by the selecting step, time segments of the partially encompassed media items in the temporal representation of the selected sub-set.

13. A computer program product including a computer readable storage medium having recorded thereon a computer program for directing a processor to execute a method for processing a set of media items, said program comprising:
 (a) code for a selecting step for selecting a sub-set of said media items;
 (b) code for a displaying step for concurrently displaying (i) a spatial representation of the selected sub-set and (ii) a temporal representation of the selected sub-set;
 (c) code for a selecting step for selecting one of a temporal navigation mode and a spatial navigation mode;
 (d) code for a providing step for providing a spatial navigation command, if the spatial navigation mode has been selected, to the spatial representation to thereby modify the selection of the sub-set of said media items, to thereby contemporaneously change the spatial representation and the corresponding temporal representation; and
 (e) code for a providing step for providing a temporal navigation command, if the temporal navigation mode has been selected, to the temporal representation to thereby modify the selection of the sub-set of said media items, to thereby contemporaneously change the temporal representation and the corresponding spatial representation, wherein the selected sub-set includes at least one of wholly encompassed media items and partially encompassed media items from the set;

the displayed spatial representation of the selected sub-set can include, dependent on spatial selection rules, at least one of representations of said wholly encompassed media items, and spatial representations of said partially encompassed media items; and the displayed temporal representation of the selected sub-set can include, dependent on temporal selection rules, at least one of a temporal representation of said wholly encompassed media items, and a temporal representation of said partially encompassed media items, the program further comprising, in relation to said partially encompassed media items:

code for determining whether a pixel area of the partially encompassed media items captured by the selecting step exceeds a pixel threshold; and code for, if the pixel area exceeds the pixel threshold;

displaying, depending upon the pixel area captured by the selecting step, a part of the partially encompassed media items in the spatial representation of the selected sub-set; and displaying, depending upon the pixel area captured by the selecting step, time segments of the partially encompassed media items in the temporal representation of the selected sub-set.

14. An apparatus for processing a set of media items, said apparatus comprising:
 a memory configured to store a program; and
 a processor for executing the program, said program comprising:
  (a) code for a selecting step for selecting a sub-set of said media items (b) code for a displaying step for concurrently displaying (i) a spatial representation of the selected sub-set and (ii) a temporal representation of the selected sub-set;
  (c) code for a selecting step for selecting one of a temporal navigation mode and a spatial navigation mode;
  (d) code for a providing step for providing a spatial navigation command, if the spatial navigation mode has been selected, to the spatial representation to thereby modify the selection of the sub-set of said media items, to thereby contemporaneously change the spatial representation and the corresponding temporal representation; and
  (e) code for a providing step for providing a temporal navigation command, if the temporal navigation mode has been selected, to the temporal representation to thereby modify the selection of the sub-set of said media items, to thereby contemporaneously change the temporal representation and the corresponding spatial representation, wherein the selected sub-set includes at least one of wholly encompassed media items and partially encompassed media items from the set;

the displayed spatial representation of the selected subset can include, dependent on spatial selection rules, at least one of representations of said wholly encompassed media items, and spatial representations of said partially encompassed media items; and the displayed temporal representation of the selected sub-set can include, dependent on temporal selection rules, at least one of a temporal representation of said wholly encompassed media items, and a temporal representation of said partially encompassed media items, the program further comprising, in relation to said partially encompassed media items:

code for determining whether a pixel area of the partially encompassed media items captured by the selecting step exceeds a pixel threshold; and code for, if the pixel area exceeds the pixel threshold;

displaying, depending upon the pixel area captured by the selecting step, a part of the partially encompassed media items in the spatial representation of the selected sub-set; and displaying, depending upon the pixel area captured by the selecting step, time segments of the partially encompassed media items in the temporal representation of the selected sub-set.

15. An apparatus for browsing a set of media items comprising:
 selecting means for selecting a sub-set of said media items;
 displaying means for displaying, substantially simultaneously, representations of said sub-set and a temporal summary related to said sub-set;
 providing means for providing a first navigation input to the display of the representations of the sub-set, to thereby effect a corresponding change in the selection of the sub-set and consequently a change in both said displayed representations of said sub-set and said displayed temporal summary related to said sub-set; and
 providing means for providing a second navigation input to the display of the temporal summary related to the sub-set, to thereby effect a corresponding change in the selection of the sub-set and consequently a change in both said displayed temporal summary related to said sub-set and said displayed representations of said sub-set, wherein the selected sub-set includes at least one of wholly encompassed media items and partially encompassed media items from the set;

the displayed representations of the selected sub-set can include, dependent on spatial selection rules, at least one of representations of said wholly encompassed media items, and representations of said partially encompassed media items; and the displayed temporal summary relating to the selected sub-set can include, dependent on temporal selection rules, at least one of a temporal summary related to said wholly encompassed media items, and a temporal summary related to said partially encompassed media items, the apparatus further comprising:

determining means for determining whether a pixel area of the partially encompassed media items captured by the selecting step exceeds a pixel threshold; and displaying means for, if the pixel area exceeds the pixel threshold;

displaying, depending upon the pixel area captured by the selecting step, a part of the partially encompassed media items in the representations of the selected sub-set; and for displaying, depending upon the pixel area captured by the selecting step, time segments of the partially encompassed media items in the temporal summary of the selected sub-set.

16. An apparatus according to claim 15, wherein the first navigation input is a spatial navigation input for effecting selection according to a set of spatial selection rules; and the second navigation input is a temporal navigation input for effecting selection according to a set of temporal selection rules.

17. An apparatus for browsing a set of media items comprising:

providing means for providing a first navigation input relative to a display in a first display window to thereby (i) select a first sub-set of said media items, (ii) display, in said first display window, representations of said first sub-set, and (iii) display, in a second display window, a temporal summary relating to said first sub-set;

providing means for providing a second navigation input relative to the display in the second display window to thereby (i) select a second sub-set of said media items, (ii) contemporaneously display, in the first display window, representations of the second sub-set, and (iii) display, in the second display window, a temporal summary relating to the second sub-set; and a display wherein the first display window and the second display window are made substantially simultaneously visible to a user, wherein the first or second selected sub-set includes at least one of wholly encompassed media items and partially encompassed media items from the set;

the displayed representations of the first or second selected sub-set can include, dependent on spatial selection rules, at least one of representations of said wholly encompassed media items, and representations of said partially encompassed media items; and the displayed temporal summary relating to the first or second selected sub-set can include, dependent on temporal selection rules, at least one of a temporal summary related to said wholly encompassed media items, and a temporal summary related to said partially encompassed media items, the apparatus further comprising:

determining means for determining whether a pixel area of the partially encompassed media items exceeds a pixel threshold; and displaying means for, if the pixel area exceeds the pixel threshold;

displaying, depending upon the pixel area, a part of the partially encompassed media items in the representations of the first or second selected subset; and for displaying, depending upon the pixel area captured by the selecting step, time segments of the partially encompassed media items in the temporal summary of the first or second selected subset.

18. An apparatus according to either one of claims 15 and 17, wherein said displayed representations comprise a spatial summary display.

19. A method of browsing a set of media items, said method comprising the steps of:

selecting a sub-set of said media items;

displaying, substantially simultaneously, representations of said sub-set and a temporal summary related to said sub-set;

providing a first navigation input to the display of the representations of the sub-set, to thereby effect a corresponding change in the selection of the sub-set and consequently a change in both said displayed representations of said sub-set and said displayed temporal summary related to said sub-set; and providing a second navigation input to the display of the temporal summary related to the sub-set, to thereby effect a corresponding change in the selection of the sub-set and consequently a change in both said displayed temporal summary related to said sub-set and said displayed representations of said sub-set, wherein the selected sub-set includes at least one of wholly encompassed media items and partially encompassed media items from the set;

the displayed representations of the selected sub-set can include, dependent on spatial selection rules, at least one of representations of said wholly encompassed media items, and spatial representations of said partially encompassed media items; and the displayed temporal summary of the selected sub-set can include, dependent on temporal selection rules, at least one of a temporal summary of said wholly encompassed media items, and a temporal summary of said partially encompassed media items, the method further comprising, in relation to said partially encompassed media items, the steps of:

determining whether a pixel area of the partially encompassed media items captured by the selecting step exceeds a pixel threshold; and if the pixel area exceeds the pixel threshold;

displaying, depending upon the pixel area captured by the selecting step, a part of the partially encompassed media items in the representations of the selected sub-set; and displaying, depending upon the pixel area captured by the selecting step, time segments of the partially encompassed media items in the temporal summary of the selected sub-set.

20. A method of browsing a set of media items, said method comprising the steps of:

providing a first navigation input relative to a display in a first display window to thereby (i) select a first sub-set of said media items, (ii) contemporaneously display, in said first display window, representations of said first sub-set, and (iii) display, in a second display window, a temporal summary relating to said first sub-set;

providing a second navigation input relative to the display in the second display window to thereby (i) select a second sub-set of said media items, (ii) contemporaneously display, in the first display window, representations of the second sub-set, and (iii) display, in the second display window, a temporal summary relating to the second sub-set; and displaying, substantially simultaneously, the first display window and the second display window, wherein the first or second selected sub-set includes at least one of wholly encompassed media items and partially encompassed media items from the set;

the displayed representations of the first or second selected sub-set can include, dependent on spatial selection rules, at least one of representations of said wholly encompassed media items, and spatial representations of said partially encompassed media items; and the displayed temporal summary of the first or second selected sub-set can include, dependent on temporal selection rules, at least one of a temporal summary of said wholly encompassed media items, and a temporal summary of said partially encompassed media items, the method further comprising, in relation to said partially encompassed media items, the steps of:

determining whether a pixel area of the partially encompassed media items exceeds a pixel threshold; and if the pixel area exceeds the pixel threshold;

displaying, depending upon the pixel area, a part of the partially encompassed media items in the representations of the first or second selected subset; and displaying, depending upon the pixel area captured by the selecting step, time segments of the partially encompassed media items in the temporal summary of the first or second selected subset.

* * * * *